United States Patent
Höhne et al.

(10) Patent No.: US 12,262,257 B2
(45) Date of Patent: Mar. 25, 2025

(54) METHODS AND SYSTEMS FOR MULTIPLE CELL TARGET CONDITIONAL HANDOVER

(71) Applicant: Nokia Technologies Oy, Espoo (FI)

(72) Inventors: Hans Thomas Höhne, Helsinki (FI); Ahmad Awada, Munich (DE); Faranaz Sabouri-Sichani, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 605 days.

(21) Appl. No.: 17/622,258

(22) PCT Filed: Jul. 8, 2020

(86) PCT No.: PCT/FI2020/050487
§ 371 (c)(1),
(2) Date: Dec. 23, 2021

(87) PCT Pub. No.: WO2021/009410
PCT Pub. Date: Jan. 21, 2021

(65) Prior Publication Data
US 2022/0256415 A1    Aug. 11, 2022

Related U.S. Application Data

(60) Provisional application No. 62/873,285, filed on Jul. 12, 2019.

(51) Int. Cl.
*H04W 36/00*   (2009.01)
*H04B 17/382*  (2015.01)
(Continued)

(52) U.S. Cl.
CPC ...... *H04W 36/0058* (2018.08); *H04B 17/382* (2015.01); *H04L 12/413* (2013.01);
(Continued)

(58) Field of Classification Search
CPC . H04W 36/00; H04W 36/305; H04W 36/362; H04W 40/36; H04B 17/318; H04B 17/382; H04L 12/413
See application file for complete search history.

(56) References Cited

U.S. PATENT DOCUMENTS

| 8,331,936 B2 | 12/2012 | Alonso-Rubio et al. |
| 2003/0125028 A1 | 7/2003 | Reynolds |

(Continued)

FOREIGN PATENT DOCUMENTS

| CN | 103329597 A | 9/2013 |
| CN | 103597874 A | 2/2014 |

(Continued)

OTHER PUBLICATIONS

Partial European Search Report received for corresponding European Patent Application No. 20841063.9, dated Jun. 22, 2023, 15 pages.

(Continued)

*Primary Examiner* — Salvador E Rivas
(74) *Attorney, Agent, or Firm* — Barta Jones, PLLC

(57) ABSTRACT

A user equipment (UE) includes at least one processor and at least one memory including computer program code. The at least one memory and the computer program code are configured to, with the at least one processor, cause the UE to obtain a conditional handover command, the conditional handover command indicating a multiple cell target for handover from a source cell and at least one performance margin, each of the at least one performance margin associated with a cell neighboring a first cell in the multiple cell target, determine whether to initiate a handover to the first cell based on the at least one performance margin, and transmit data to the first cell based on the determination of whether to initiate the handover.

20 Claims, 15 Drawing Sheets

(51) Int. Cl.
  *H04L 12/413*  (2006.01)
  *H04W 36/30*  (2009.01)
  *H04W 36/36*  (2009.01)
  *H04B 17/318*  (2015.01)

(52) U.S. Cl.
  CPC .............. *H04W 36/00698* (2023.05); *H04W 36/00837* (2018.08); *H04W 36/30* (2013.01); *H04W 36/304* (2023.05); *H04W 36/362* (2023.05); *H04B 17/318* (2015.01); *H04W 36/00838* (2023.05)

(56) References Cited

U.S. PATENT DOCUMENTS

| | | | |
|---|---|---|---|
| 2007/0117564 A1* | 5/2007 | Reynolds | H04W 36/24 455/436 |
| 2010/0027507 A1 | 2/2010 | Li et al. | |
| 2014/0194121 A1* | 7/2014 | Lindoff | H04W 36/304 455/436 |
| 2015/0105084 A1* | 4/2015 | Bontu | H04W 36/0072 455/437 |
| 2016/0014666 A1 | 1/2016 | Muller et al. | |
| 2016/0262065 A1 | 9/2016 | Axmon et al. | |
| 2016/0345231 A1* | 11/2016 | Moon | H04W 36/22 |
| 2020/0077312 A1* | 3/2020 | Tsuboi | H04B 17/309 |
| 2020/0187069 A1* | 6/2020 | Hong | H04W 36/0061 |
| 2020/0200860 A1* | 6/2020 | Hong | H04B 17/318 |
| 2020/0336957 A1* | 10/2020 | Wu | H04W 76/27 |

FOREIGN PATENT DOCUMENTS

| | | |
|---|---|---|
| CN | 104185222 A | 12/2014 |
| CN | 104303557 A | 1/2015 |
| CN | 108476528 A | 8/2018 |
| CN | 109982401 A | 7/2019 |
| KR | 20110067827 A | 6/2011 |
| KR | 20180122963 A | 11/2018 |
| WO | 2010/077192 A1 | 7/2010 |
| WO | 2018/018513 A1 | 2/2018 |
| WO | 2018/170777 A1 | 9/2018 |
| WO | 2018/172600 A1 | 9/2018 |
| WO | 2018/186482 A1 | 10/2018 |
| WO | 2019/108114 A1 | 6/2019 |

OTHER PUBLICATIONS

"Further details of conditional handover in LTE", 3GPP TSG RAN WG2 #105, R2-1901082, Agenda: 12.3.3, Ericsson, Feb. 25-Mar. 1, 2019, 7 pages.

Office Action received for corresponding Chinese Patent Application No. 202080050580.9, dated Mar. 23, 2024, 7 pages of Office Action and no page of translation available.

"New WID: NR mobility enhancements", 3GPP TSG RAN Meeting #80, RP-181433, Agenda: 9.1.10, Intel Corporation, May 21-25, 2018, 5 pages.

Martikainen et al., "On the Basics of Conditional Handover for 5G Mobility", IEEE 29th Annual International Symposium on Personal, Indoor and Mobile Radio Communications (PIMRC), Sep. 9-12, 2018, 7 pages.

"MulteFire Alliance Technical Specification Group Radio Access Network; Evolved Universal Terrestrial Radio Access (E-UTRA); Radio Resource Control (RRC); Protocol specification (Release 1.1)", MFA TS 36.331, V1.1.3, Feb. 2019, pp. 1-811.

"MulteFire Alliance Technical Specification Group Radio Access Network; Evolved Universal Terrestrial Radio Access Network (E-UTRAN); X2 application protocol (X2AP) (Release 1.1)", MFA TS 36.423, V1.1.2 , Feb. 2019, pp. 1-253.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"Triggers for Conditional Handover in LTE", 3GPP TSG-RAN WG2 Meeting #105bis, R2-1903557, Agenda: 12.3.3.1, InterDigital Inc, Apr. 8-12, 2019, pp. 1-3.

"3rd Generation Partnership Project; Technical Specification Group Radio Access Network; NG-RAN; Xn application protocol (XnAP) (Release 15)", 3GPP TS 38.423, V15.3.0, Mar. 2019, pp. 1-294.

"36.300 CR for Conditional Handover", 3GPP TSG-RAN WG2 #105bis, R2-1904860, China Telecom, Apr. 8-12, 2019, 5 pages.

International Search Report and Written Opinion received for corresponding Patent Cooperation Treaty Application No. PCT/FI2020/050487, dated Oct. 7, 2020, 13 pages.

Notice of Allowance received for corresponding Chinese Patent Application No. 202080050580.9, dated Sep. 25, 2024, 6 pages of Notice of Allowance and no page of translation available.

"Triggering of Conditional Handover in LTE", 3GPP TSG RAN WG2 #106, R2-1906196, Agenda: 12.3.3.2, Ericsson, May 13-17, 2019, pp. 1-4.

Extended European Search Report received for corresponding European Patent Application No. 24189552.3, dated Oct. 15, 2024, 10 pages.

"CHO execution condition", 3GPP TSG RAN WG2 Meeting #106, R2-1906293, Agenda: 12.3.3.1, Intel Corporation, May 13-17, 2019, 3 pages.

\* cited by examiner

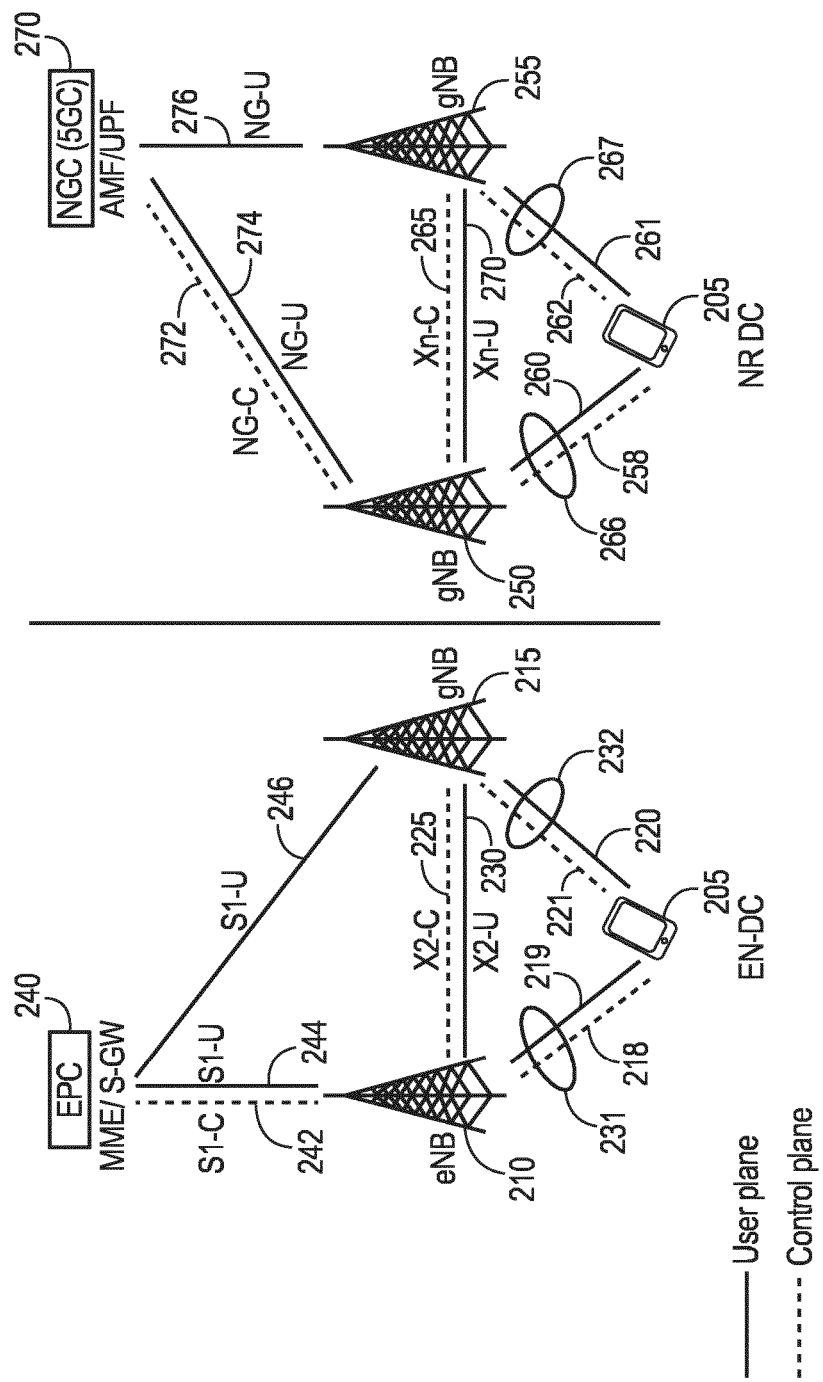
FIG. 2A  EN-DC
FIG. 2B  NR DC

METHODS AND SYSTEMS FOR MULTIPLE CELL TARGET CONDITIONAL HANDOVER

RELATED APPLICATION

This application was originally filed as PCT Application No. PCT/FI2020/050487, filed on 8 Jul. 2020, which claims priority from U.S. Provisional Application 62/873,285, filed on 12 Jul. 2019, each of which is incorporated herein by reference in its entirety.

TECHNICAL FIELD

One or more example embodiments relate to wireless communication systems.

BACKGROUND

Fifth generation (5G) wireless communications networks are the next generation of mobile communications networks. Standards for 5G communications networks are currently being developed by the Third Generation Partnership Project (3GPP). These standards are known as 3GPP New Radio (NR) standards.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

A Conditional Handover (CHO) has two phases. A configured event triggers a user equipment (UE) to send a measurement report. Based on this report, a source cell prepares a target for the handover, which includes a handover request and handover request acknowledgement. The source cell then sends a CHO command to the UE.

In systems, utilizing dual connectivity (DC), a target configuration may include multiple cells.

For a legacy HO, the UE will access the target cell to complete the handover. However, for CHO, the UE will access the target once an additional CHO execution condition is met. The condition is typically configured by the source cell as part of the CHO command.

The inventors have discovered that interference caused by a multiple cell target to target neighbor cells is not considered. For example, when a mobility event such as A3 is evaluated, a cell individual offset (CIO) is considered (3GPP TS 38.331 section 5.5.4.4, Release 15). However, the CIO is evaluated for the imbalance/difference in signal strength between source and target cells, not for cells within a target, nor as an imbalance/difference in signal strengths for cells neighboring the target cell.

Moreover, a CHO does not use an aggregate signal strength/quality of a HO target having multiple cells.

One or more example embodiments provide mechanisms by which a network node, a UE and a target perform a conditional handover to a target of multiple cells using an interference related margin with respect to cells neighboring the target.

One or more example embodiments provide mechanisms by which network node, a UE and a target perform a conditional handover using an aggregate measurement of which belong to a target. The UE considers in the HO the measurements of a target and its corresponding cells that can be configured in DC or Carrier Aggregation (CA) operation.

Moreover, one or more example embodiments by which network node, a UE and a target perform a conditional handover using a combination of measurement event conditions that are specific to cells within a target as a condition to perform the CHO.

At least one example embodiment provides a user equipment (UE) includes at least one processor and at least one memory including computer program code. The at least one memory and the computer program code are configured to, with the at least one processor, cause the UE to obtain a conditional handover command, the conditional handover command indicating a multiple cell target for handover from a source cell and at least one performance margin, each of the at least one performance margin associated with a cell neighboring a first cell in the multiple cell target, determine whether to initiate a handover to the first cell based on the at least one performance margin, and transmit data to the first cell based on the determination of whether to initiate the handover.

In at least one example embodiment, the at least one performance margin is a permitted signal offset for a first frequency.

In at least one example embodiment, the permitted signal offset is a permitted difference between a measured signal strength of the first cell and a measured signal strength of the cell neighboring the first cell.

In at least one example embodiment, the at least one memory and the computer program code are further configured to, with the at least one processor, cause the UE to measure at least one signal from the first cell, determine whether a condition of the conditional handover is satisfied based on the measured at least one signal from the first cell, and select the first cell as a handover target cell if the condition is determined to be satisfied.

In at least one example embodiment, the at least one memory and the computer program code are further configured to, with the at least one processor, cause the UE to measure at least one signal from the source cell, and determine whether the condition of the conditional handover is satisfied based on the measured at least one signal from the source cell and the measured at least one signal from the first cell.

In at least one example embodiment, the at least one memory and the computer program code are further configured to, with the at least one processor, cause the UE to measure at least one signal from the cell neighboring the first cell and determine whether to initiate the handover to the first cell based on the at least one performance margin, the measured at least one signal from the first cell and the measured at least one signal from the cell neighboring the first cell.

In at least one example embodiment, the at least one memory and the computer program code are further configured to, with the at least one processor, cause the UE to initiate the handover to the first cell when a difference between the measured at least one signal from the first cell and the measured at least one signal from the cell neighboring the first cell is less than the performance margin.

At least one example embodiment provides a user equipment (UE) including means for obtaining a conditional handover command, the conditional handover command indicating a multiple cell target for handover from a source cell and at least one performance margin, each of the at least one performance margin associated with a cell neighboring a first cell in the multiple cell target; means for determining whether to initiate a handover to the first cell based on the at least one performance margin; and means for transmitting data to the first cell based on the determination of whether to initiate the handover.

In at least one example embodiment, the at least one performance margin is a permitted signal offset for a first frequency.

In at least one example embodiment, the permitted signal offset is a permitted difference between a measured signal strength of the first cell and a measured signal strength of the cell neighboring the first cell.

In at least one example embodiment, UE further includes means for measuring at least one signal from the first cell; means for determining whether a condition of the conditional handover is satisfied based on the measured at least one signal from the first cell; and means for selecting the first cell as a handover target cell if the condition is determined to be satisfied.

In at least one example embodiment, UE further includes means for measuring at least one signal from the source cell; and means for determining whether the condition of the conditional handover is satisfied based on the measured at least one signal from the source cell and the measured at least one signal from the first cell.

In at least one example embodiment, UE further includes means for measuring at least one signal from the cell neighboring the first cell and means for determining whether to initiate the handover to the first cell based on the at least one performance margin, the measured at least one signal from the first cell and the measured at least one signal from the cell neighboring the first cell.

In at least one example embodiment, UE further includes means for initiating the handover to the first cell when a difference between the measured at least one signal from the first cell and the measured at least one signal from the cell neighboring the first cell is less than the performance margin.

At least one example embodiment provides a method including obtaining a conditional handover command, the conditional handover command indicating a multiple cell target for handover from a source cell and at least one performance margin, each of the at least one performance margin associated with a cell neighboring a first cell in the multiple cell target; determining whether to initiate a handover to the first cell based on the at least one performance margin; and transmitting data to the first cell based on the determination of whether to initiate the handover.

In at least one example embodiment, the at least one performance margin is a permitted signal offset for a first frequency.

In at least one example embodiment, the permitted signal offset is a permitted difference between a measured signal strength of the first cell and a measured signal strength of the cell neighboring the first cell.

In at least one example embodiment, the method includes measuring at least one signal from the first cell; determining whether a condition of the conditional handover is satisfied based on the measured at least one signal from the first cell; and selecting the first cell as a handover target cell if the condition is determined to be satisfied.

In at least one example embodiment, the method includes measuring at least one signal from the source cell, wherein the determining whether the condition of the conditional handover is satisfied determines whether the condition of the conditional handover is satisfied based on the measured at least one signal from the source cell and the measured at least one signal from the first cell.

In at least one example embodiment, the method includes measuring at least one signal from the cell neighboring the first cell, wherein the determining whether to initiate the handover includes determining whether to initiate the handover to the first cell based on the at least one performance margin, the measured at least one signal from the first cell and the measured at least one signal from the cell neighboring the first cell.

In at least one example embodiment, the method includes initiating the handover to the first cell when a difference between the measured at least one signal from the first cell and the measured at least one signal from the cell neighboring the first cell is less than the performance margin.

At least one example embodiment provides a non-transitory computer-readable storage medium storing computer-readable instructions that, when executed at a user equipment (UE), cause the UE to perform a method, the method including obtaining a conditional handover command, the conditional handover command indicating a multiple cell target for handover from a source cell and at least one performance margin, each of the at least one performance margin associated with a cell neighboring a first cell in the multiple cell target; determining whether to initiate a handover to the first cell based on the at least one performance margin; and transmitting data to the first cell based on the determination of whether to initiate the handover.

At least one example embodiment provides a user equipment (UE) including at least one processor; and at least one memory including computer program code, the at least one memory and the computer program code configured to, with the at least one processor, cause the UE to obtain a conditional handover command, the conditional handover command indicating at least one aggregate condition for a handover, measure first signals from cells in a first multiple cell target, aggregate at least a portion of the measured first signals, and select a handover target based on the at least one aggregate condition and the aggregated portion of the measured first signals.

In at least one example embodiment, the at least one memory and the computer program code are further configured to, with the at least one processor, cause the UE to obtain an offset value, determine a difference between the aggregated portion of the measured first signals and the offset value, and select the handover target based on the difference.

In at least one example embodiment, the at least one memory and the computer program code are further configured to, with the at least one processor, cause the UE to measure second signals from cells in a second multiple cell target, aggregate at least a portion the measured second signals, and select the handover target based on the at least one aggregate condition, the aggregated portion of the measured first signals and the aggregated portion of the measured second signals.

In at least one example embodiment, the at least one memory and the computer program code are further configured to, with the at least one processor, cause the UE to select the portion of the measured first signals based on strengths of the measured first signals, a number of the portion of the measured first signals being less than a total number of the cells in the first multiple cell target.

In at least one example embodiment, the number of the portion of the measured first signals is greater than one.

At least one example embodiment provides a user equipment (UE) including means for obtaining a conditional handover command, the conditional handover command indicating at least one aggregate condition for a handover;

means for measuring first signals from cells in a first multiple cell target, means for aggregating at least a portion of the measured first signals; and means for selecting a handover target based on the at least one aggregate condition and the aggregated portion of the measured first signals.

In at least one example embodiment, the UE further includes means for obtaining an offset value; means for determining a difference between the aggregated portion of the measured first signals and the offset value; and means for selecting the handover target based on the difference.

In at least one example embodiment, the UE further includes means for measuring second signals from cells in a second multiple cell target; means for aggregating at least a portion the measured second signals; and means for selecting the handover target based on the at least one aggregate condition, the aggregated portion of the measured first signals and the aggregated portion of the measured second signals.

In at least one example embodiment, the UE further includes means for selecting the portion of the measured first signals based on strengths of the measured first signals, a number of the portion of the measured first signals being less than a total number of the cells in the first multiple cell target.

In at least one example embodiment, the number of the portion of the measured first signals is greater than one.

At least one example embodiment provides a method including obtaining a conditional handover command, the conditional handover command indicating at least one aggregate condition for a handover; measuring first signals from cells in a first multiple cell target; aggregating at least a portion of the measured first signals; and selecting a handover target based on the at least one aggregate condition and the aggregated portion of the measured first signals.

In at least one example embodiment, the method further includes obtaining an offset value; and determining a difference between the aggregated portion of the measured first signals and the offset value, wherein the selecting selects the handover target based on the difference.

In at least one example embodiment, the method further includes measuring second signals from cells in a second multiple cell target; and aggregating at least a portion of the measured second signals, wherein the selecting selects the handover target based on the at least one aggregate condition, the aggregated portion of the measured first signals and the aggregated portion of the measured second signals.

In at least one example embodiment, the selecting selects the portion of the measured first signals based on strengths of the measured first signals, a number of the portion of the measured first signals being less than a total number of the cells in the first multiple cell target.

In at least one example embodiment, a number of the portion of the measured first signals is greater than one.

At least one example embodiment provides a non-transitory computer-readable storage medium storing computer-readable instructions that, when executed at a user equipment (UE), cause the UE to perform a method, the method including obtaining a conditional handover command, the conditional handover command indicating at least one aggregate condition for a handover; measuring first signals from cells in a first multiple cell target; aggregating the measured first signals; and selecting a handover target based on the at least one aggregate condition and the aggregated measured first signals.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIGS. 2A-2C illustrate example systems having dual connectivity.

DETAILED DESCRIPTION

Figure 1:
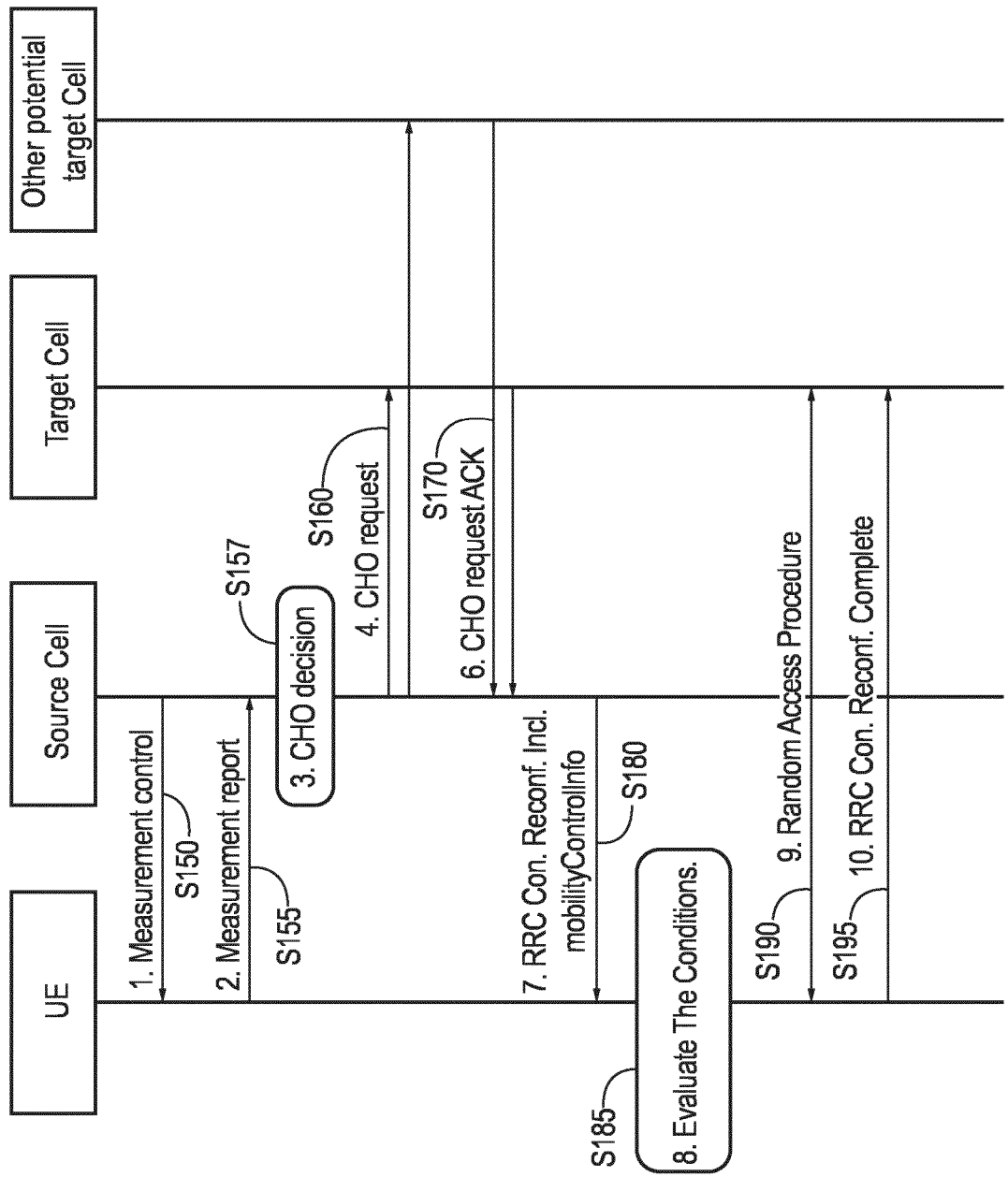
FIG. 1 illustrates an example of a Conditional Handover.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of network nodes (e.g., radio access network (RAN) elements, base stations, eNBs, gNBs, Central Units (CUs), ng-eNBs, WLAN access points or controllers, etc.), user equipment (UE), or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a network node to perform the operations discussed herein. As discussed herein, UE and User may be used interchangeably. Moreover, a UE or User may be referred to as being served by the node or cell when the UE or User is within the cell and the node is providing wireless resources for transmission to/from the UE or User. In WLAN networks a UE or User may be a station (STA).

Further, some example embodiments are applicable also to cells which are set up by UEs, such as UEs which have the ability to act as a gNB. Some example embodiments are also applicable to relay nodes, such as Integrated Access Backhaul (IAB) nodes. It may be applicable to New Radio Unlicensed (NR-U) nodes and UEs. Some example embodiments are may be applicable also to device-to-device (D2D) communications. Some example embodiments are be applicable to MulteFire systems. In general, some example embodiments are apply to situations where CHO is used for multi-cell targets.

It will be appreciated that a number of example embodiments may be used in combination.

Throughout the description, a cell of a particular network node (e.g., base station, eNB, gNB, ng-eNB) is described as a "serving cell" or "source cell" for a particular UE. The transmissions to and from the UE are served through the network node, and the coverage area of the network node can be termed as the "serving cell" or "source cell" of the UE. We may use the term 'cell' to refer to either the coverage area of transmission of a particular network node, or the network node itself, depending on the context. Typically, the area within which the transmissions of the neighbor network nodes can be received will have some overlap with the area within which the transmissions of a serving network node can be received. A UE may be able to also receive transmissions from one or more network nodes in a neighbor set. Conversely, it may be possible to receive the signal of a given UE's uplink transmissions at not only its serving cell but also at one or more neighbor cells.

FIG. 1 illustrates an example of a conditional handover.

At S150, a source cell sends a measurement control to a UE. The measurement control configures the measurement procedures for the UE. At S155, the UE responds to the measurement control by generating and sending a measurement report to the source cell. At S157, the source cell decides whether to use a CHO to hand off the UE. In some example embodiments, the source cell decides whether to use the CHO based on the measurement report received at S155 and radio resource management (RRM) information. In addition to or as an alternative, the source cell may decide whether to use the CHO based on whether the UE is connected to the source cell. If the source cell decides to use a CHO to hand off the UE, at S160, the source cell generates and sends a CHO request to one or more target cells based on the measurement report which the CHO target cell(s) belong to. Upon receiving the CHO request, the target cell(s) perform admission control.

At S170, the target cell acknowledges the handover request and is prepared to receive communications from the UE. Upon receiving the handover request acknowledgement from the target cell, the source cell sends a CHO command to the UE at S180. The CHO command serves the purpose to allow a UE to react more quickly to changing conditions and select a new source cell. However, the UE evaluates conditions for selecting a new source cell which in a normal HO would have been carried out by the existing source cell.

In the CHO command, a RRCReconfiguration, as set forth in 3GPP TS 38.331 Release 15, is prepared by the source cell and provided to the UE. The RRCreconfiguration may contain the configuration for multiple cells, for carrier aggregation (CA) or for dual connectivity (DC). The configuration for multiple cells is included in the RRCReconfiguration for instance as a set of parameters in the information element (IE) CellGroupConfiguration. In CA, the HO happens first to a target primary cell (PCell), and secondary cells (SCells) are de-activated after HO. The target PCell activates the SCells.

In DC, the CHO happens to the target PCell, in the sense that a radio resource control (RRC) connection is established between the PCell and the UE. The PCell then performs a PSCell addition procedure which initiates the establishment of a connection between the PSCell and the UE. The PSCell and the UE will also have an RRC connection. The RRC connection between the PSCell and UE may be routed via the PCell, or directly via a signaling radio bearer (SRB) between the UE and the PSCell.

In some example embodiments, a DC HO command received by the UE may cause the UE to establish connection to PCell and PSCell in parallel, e.g. by performing random access procedures to both in parallel. Thus, multi-cell target configurations can be provided in a CHO command, because the source cell has evaluated the suitability of the target cells based on the UE's measurements and other information available to the source cell. In some example embodiments, the source cell has evaluated the suitability of the target cell prior to issuing the CHO command to the UE.

At S185, the UE maintains connection with the source cell after receiving the CHO command and starts to evaluate the CHO target cell(s). More specifically, the UE monitors communications for the condition to be satisfied. Once the UE determines the condition is satisfied by a CHO target cell, the UE initiates the handover to the target cell by performing a random access procedure with the target cell at S190. When the handover is complete, the UE acknowledges the handover by generating and sending a handover complete acknowledgement to the target cell at S195 (e.g., a RRCConnectionReconfigurationComplete message as set forth in 3GPP TS 38.331, Release 15).

Figure 12:
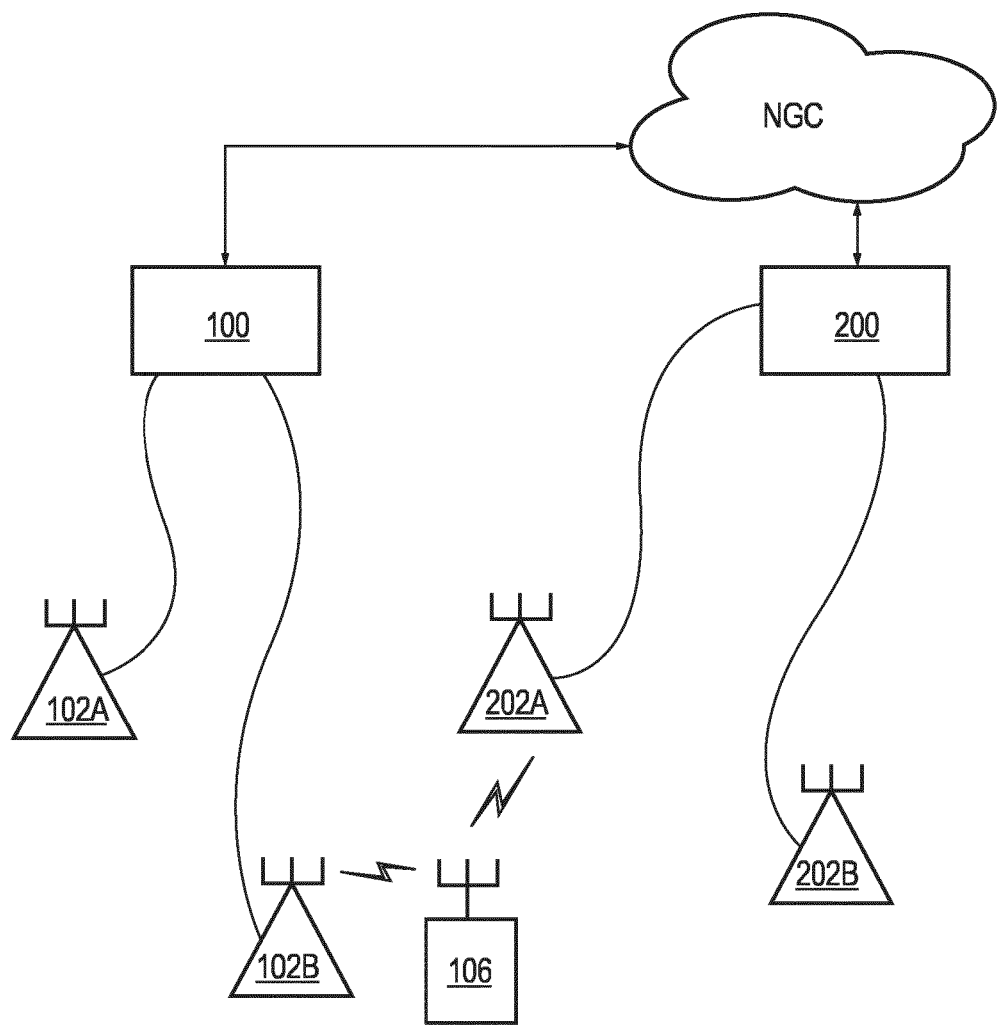
FIG. 12 illustrates a simplified diagram of a portion of a 3GPP NR access deployment for explaining example embodiments.

FIG. 12 illustrates a simplified diagram of a portion of a Third Generation Partnership Project (3GPP) New Radio (NR) access deployment.

Referring to FIG. 12, the 3GPP NR radio access deployment includes a gNB (or node) 100 having transmission and reception points (TRPs) 102A and 102B and a gNB (or node) 200 having TRPs 202A and 202B. Each TRP 102A, 102B, 202A, 202B may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 202A, 202B provide cellular resources for user equipment (UEs) within a geographical coverage area referred to as a cell. In the example shown in FIG. 12, the TRPs 102A, 102B, 202A, 202B are configured to communicate with one or more UEs (e.g., UE or User 106) via one or more transmit (TX)/receive (RX) beam pairs. The gNBs 100 and 200 communicate with the core network, which may be referred to as the Next Generation Core (NGC) in 3GPP NR.

The TRPs 102A, 102B, 202A, 202B may have independent schedulers, or the gNBs 100 and 200 may perform joint scheduling among their respective TRPs.

Although only a single UE 106 is shown in FIG. 12, the gNBs 100 and 200 and their respective TRPs 102A, 102B, 202A, 202B may provide communication services to a relatively large number of UEs within a cell.

Figure 2C:
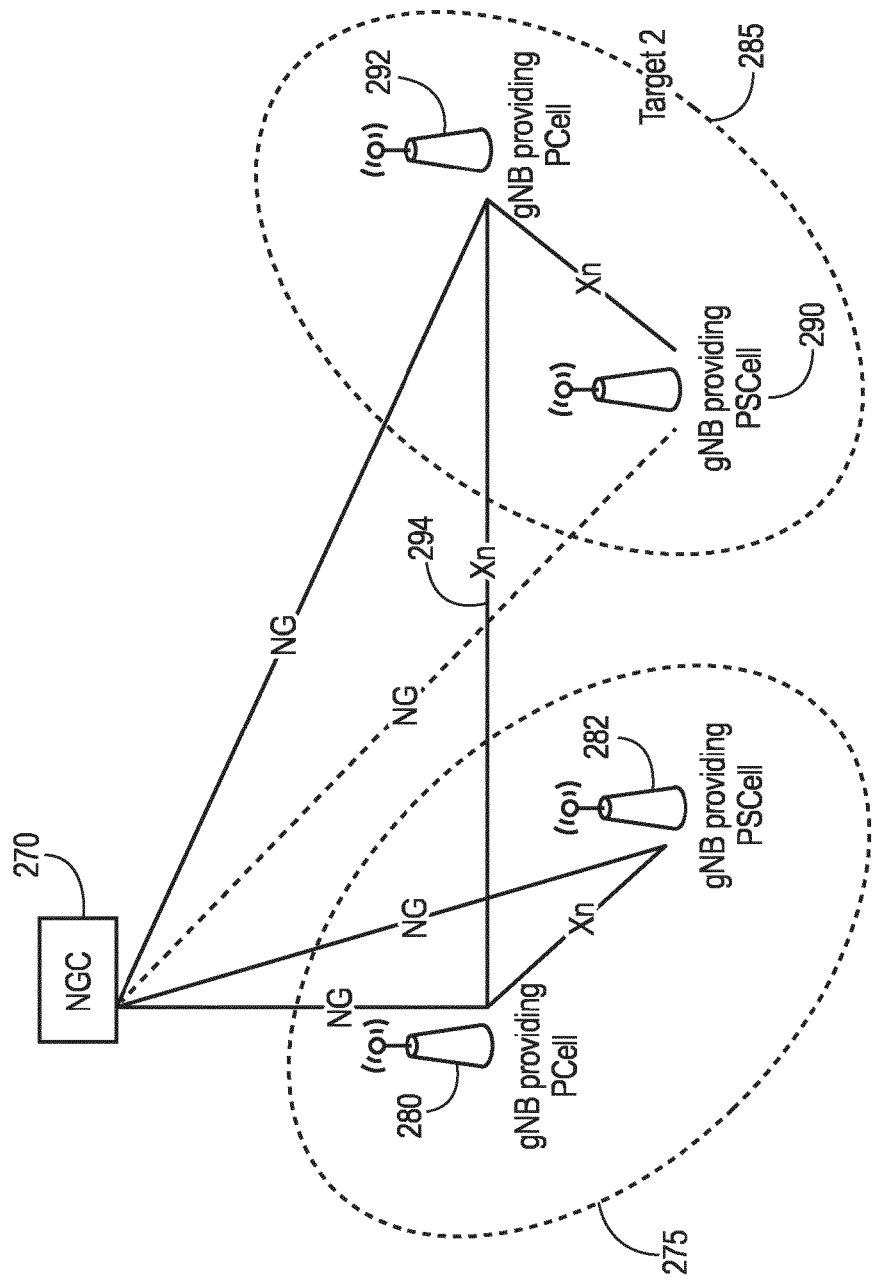

FIGS. 2A-2C illustrate systems having dual connectivity. FIG. 2A illustrates an Evolved-Universal Terrestrial Radio Access-New Radio dual connectivity (EN-DC) system. As shown in FIG. 2A, a UE 205 may communicate with an evolved NodeB (eNB) 210 and a next generation NodeB (gNB) 215. In the EN-DC system of FIG. 2A, the eNB 210 functions as a primary node and the gNB 215 functions as a secondary node. Thus, communications with the UE 205 and the eNB 210 occur across a user plane 218 and a control plane 219 via a Uu interface 231. Communications between the UE 205 and the gNB 215 occur across a user plane 220 via a Uu interface 232. Communication between the UE 205 and the gNB 215 (e.g., a PSCell) may happen also via an SRB (SRB3), providing a control plane connection 221 via the Uu interface 232. The eNB 210 and the gNB 215 communicate over an X2 control (X2-C) interface 225 and an X2 user (X2-U) interface 230. Both the eNB 210 and the gNB 215 communicate with an evolved packet core (EPC) 240. The eNB 210 communicates with the EPC 240 over an S1 control (S1-C) interface 242 and an S2 user (S1-U) interface 242. The gNB 215 communicates with the EPC 240 over an S1-U 246.

FIG. 2B illustrates a New Radio dual connectivity (NR DC) system. As shown in FIG. 2B, the UE 205 may communicate with a gNB 250 and a gNB 255. In the NR DC system of FIG. 2B, the gNB 250 functions as a primary node and the gNB 255 functions as a secondary node. The gNB 250 provides a primary cell (PCell) and the gnB 255 provides a primary secondary cell (PSCell). Thus, communications with the UE 205 and the gNB 250 occur across a user plane 258 and a control plane 260 via a Uu interface 266. Communications between the UE 205 and the gNB 255 occur across a user plane 261 via a Uu interface 267. Communication between the UE and the PSCell may happen also via an SRB (SRB3), providing a control plane connection 262 via the Uu interface 267. The gNB 250 and the gNB 255 communicate over an Xn control (Xn-C) interface 265 and an Xn user (Xn-U) interface 270. Both the gNB 250 and the gNB 255 communicate with a next generation core (NGC) 270. The gNB 250 communicates with the NGC 270 over a next generation control (NG-C) interface 272 and a next generation user (NG-U) interface 274. The gNB 255 communicates with the NGC 270 over an NG-U 276. The gNB 250 may also be an eNB with the ability to have an Xn and NG interface.

In CA, a single gNB (e.g., the gNB 250) has a NG connection to the NGC and the Uu interface to the UE 205. The single gNB establishes multiple cells on different frequencies. One of established cells is the Master cell which carries the RRC connection. The cells may be overlapping in coverage, or may be separated by remote radio heads.

FIG. 2C illustrates an NR or LTE DC system having multiple DC configurations.

The CHO command will contain the configuration for a possible HO target. The target is thus a cell or a group of cells in a CA or DC configuration. In a CHO it is possible that not only a single but multiple targets are provided to the UE in the CHO command or separate CHO commands. Thus, the UE is enabled to evaluate a HO condition to different targets coming into view based on its trajectory.

A gNB or eNB may be aware of its neighbors as it is, e.g., providing measurement configurations referring to neighbors to the UE, and also issuing HO commands for neighbors to the UE, and communicating with its neighbors via the Xn or X2 interface. A gNB may also have neighbors but not an Xn interface with those neighbors. A gNB or eNB may also be aware of its neighbors' neighbors. This is possible by corresponding signaling on the Xn interface, where the neighbors may exchange a list of records, each record of a neighbor providing information including a physical cell identifier (PCI), cell global identity (CGI), tracking area code (TAC), and more.

The neighbor information can be exchanged as information elements. In some example embodiments, the neighbor information may be exchanged as part of the XnSetup procedure in the NeighbourInformation IE which is in the ServedCells IE, as set forth in 3GPP TS 38.423, Release 15. The corresponding information element can be enhanced to carry additional information regarding tolerable imbalance parameters mentioned in some example embodiments. In some example embodiments, the information element could be exchanged using new procedures not only relying on the XnSetup.

As shown in FIG. 2C, a dual connectivity group 275 and dual connectivity group 285 communicate with each other through an Xn interface 294. The Xn interface 294 may include user plane and control plane communications. The dual connectivity group 275 includes a gNB 280 providing a PCell and a gNB 282 providing a PSCell. The gNB 280 and the gNB 282 communicate with each other and the NGC 270 in a similar manner as described in FIG. 2B. The dual connectivity group 285 includes a gNB 292 providing a PCell and a gNB 290 providing a PSCell. The gNB 292 and the gNB 290 communicate with each other and the NGC 270 in a similar manner as described in FIG. 2B.

More specific details of example embodiments will be described herein with regard to the 3GPP NR access deployment shown in FIG. 12. Although various access deployments have been shown in FIGS. 2A-2C and 12, the following discussion may refer to eNBs and gNBs more generically as cells or network nodes. Moreover, it should be understood that example embodiments should not be limited to the example access deployments illustrated in FIGS. 2A-C and 12.

Figure 3:
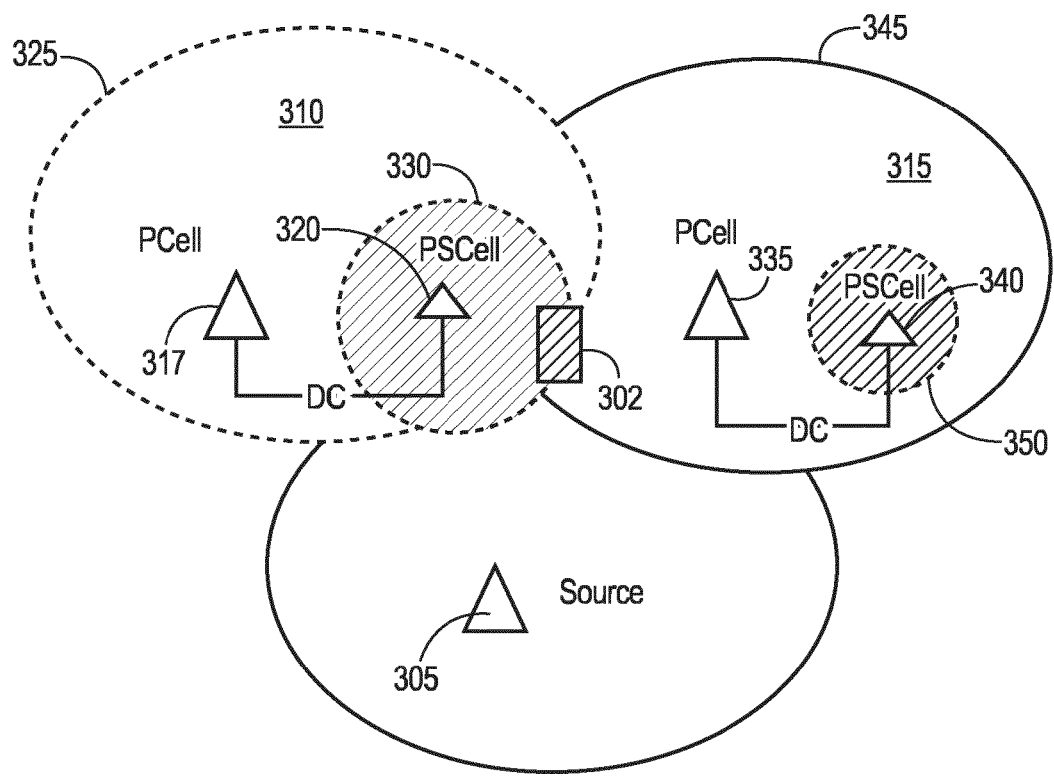
FIG. 3 illustrates a system having two potential targets for a handover according to example embodiments.

FIG. 3 illustrates a system having two potential targets for a handover. As shown in FIG. 3, a UE 302 communicates with a source cell 305. Based on the location of the UE 302, the UE 302 has a first target configuration 310 for handover and a second target configuration 315 for handover.

In the example shown in FIG. 3, the first target configuration 310 includes a cell 317 and a cell 320 that are configured to provide dual connectivity. The cell 317 can operate as a PCell and can provide a primary cell of coverage 325. The cell 320 can operate as a PSCell and can provide a primary secondary cell of coverage 330. While the secondary cell of coverage 330 is illustrated as being completely within the primary cell of coverage 325, example embodiments are not limited therein.

An RRC Reconfiguration contains a secondaryCellGroup IE and a masterCellGroup IE, each containing a SpCell IE which configures a primary cell (PCell or PSCell). Thus, a UE can be provided with information about a potential PCell and PScell.

It should be understood that a primary cell of coverage and a secondary cell of coverage may partially overlap or not overlap.

The second target configuration 315 includes a cell 335 and a cell 340 that are configured to provide dual connectivity. The cell 335 can operate as a PCell and provides a primary cell of coverage 345. The cell 340 can operate as a PSCell and provides a primary secondary cell over coverage 350.

When handing over to a target configuration having a multi-cell configuration, a cell within the target configuration may exhibit a weaker strength compared to other neighboring cells using the same frequency. This may lead to a higher interference coming from the intra-frequency neighboring cells.

For example, if a handover occurs from the source cell 305 to the first target configuration 310 comprising cell 317 because the first target configuration 310 has a higher guaranteed bitrate (GBR) than the second target configuration 315, uplink (UL) interference will occur if the UE 302 is closer to the target cell 335 than the target cell 317 and the target cell 335 and the target cell 317 use the frequency/carrier/subband. Moreover, communications from the target cell 335 will create downlink (DL) interference for communications transmitted by the target cell 317 and received by the UE 302.

When mobility event such as A3 is evaluated, a cell individual offset (CIO) is also considered, such as described in 3GPP TS 38.331 section 5.5.4.4, Release 15. However, the CIO is evaluated for the imbalance/difference in signal strength between source and target cells, not for cells within the target configuration, nor as an imbalance/difference in signal strengths for cells neighboring the target.

Thus, at least some example embodiments use an interference related margin with respect to neighboring cells on a frequency/carrier/subband during a CHO. The margin may be specific to a neighbor of a cell in the target using a same frequency. Moreover, the margin may be set by a target cell of the handover based on tolerable interference.

Currently, events apply to cells belonging to a single target cell of handover, not an aggregate quality, nor neighboring cells of a target cell.

Interference Related Margin

A CHO condition may be based on evaluating the received signal strength of several possible target cells provided in the measurement configuration against a received signal strength of the source cell. With existing mechanisms, a strongest cell on a given frequency can be selected by basing a HO decision on a measurement of a single cell such as reference signal received power (RSRP) or reference signal received quality (RSRQ). This avoids creating undue interference to other cells.

With the introduction of multi-cell targets, there may be some cells among the cells of the ultimately chosen target which are weaker than cells neighboring targets. For example, if a DC target is selected based only on a RSRP of a PCell in the selected target, a large imbalance in strength of the PSCell (being on a different frequency) of the selected target to an intra-frequency neighbor of the PSCell cell may exist.

Furthermore, in CHO, measurements taken earlier and reported to the gNB by the UE may be out-of-date at the time the condition is met.

In some example embodiments, a condition to carry out a CHO to a HO target including multiple cells includes an interference related margin to other neighboring cells on a specific frequency/carrier/subband. The margin may be specific to a neighbor of a cell in the target configuration using the same frequency. The margin can be communicated to the UE as part of the CHO command. In some example embodiments, the margin can be set by the target cell's neighbor. In other example embodiments, the margin can be set by the target cell when the target cell knows about its neighbor's allowed interference related margin. The margin can be set to a default value by the source cell.

Figure 4A:
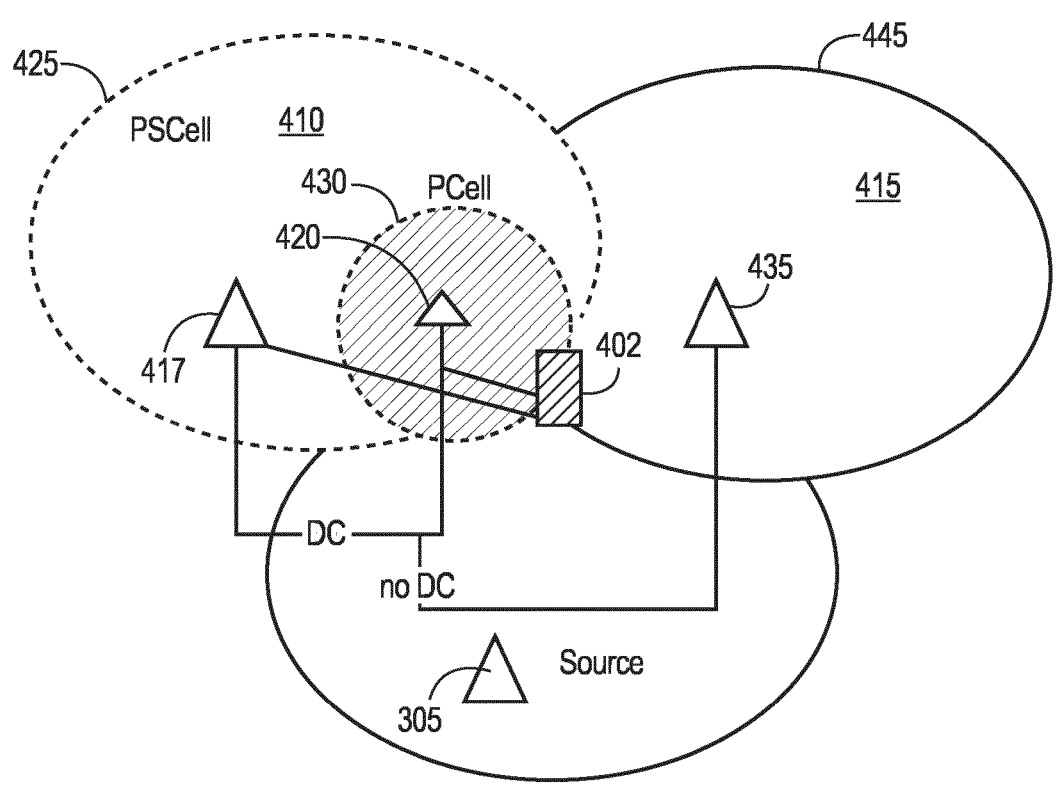
FIG. 4A illustrates a system having two potential targets for a handover according to example embodiments.

FIG. 4A illustrates a system having two potential targets for a handover. As shown in FIG. 4A, a UE 402 communicates with a source cell 405. Based on the location of the UE 402, the UE 402 has a first target configuration 410 for handover and a second target configuration 415 for handover.

The first target configuration 410 includes a cell 417 and a cell 420 that are configured to provide dual connectivity. The cell 420 can operate as a PCell and provides a primary cell of coverage 430. The cell 417 can operate as a PSCell and provides a primary secondary cell of coverage 425.

The second target configuration 415 includes a cell 435. The cell 435 provides a cell of coverage 445. The cell 435 provides a cell neighboring the target configuration 410. While the second target configuration 415 does not illustrate multiple cells, example embodiments are not limited thereto. Moreover, while the first target configuration 410 is illustrated as a DC configuration, it should be understood that example embodiments are not limited thereto and may be implemented in targets having a CA configuration or cells being on different frequencies.

In the system of FIG. 4A, both the cell 417 and the cell 435 use a same frequency f1 (e.g., operating on a same carrier as a download frequency, an upload frequency or both). The cell 420 uses a frequency f2.

Figure 4B:
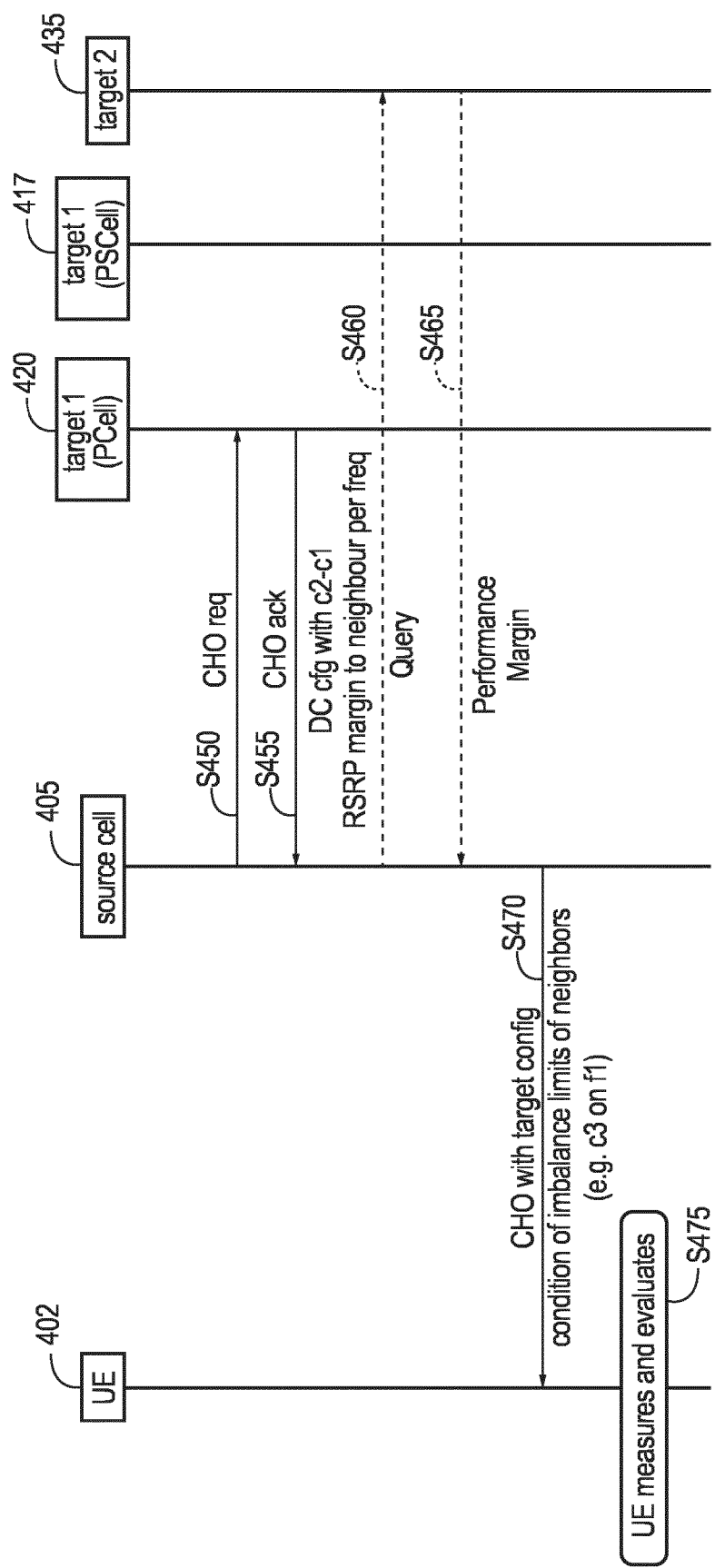
FIG. 4B is a flow chart illustrating a method according to example embodiments.

In the system, a CHO may be performed by the source cell 405, the UE 402 and any one of the cells 417, 420 and 435 using an interference related margin as shown in FIG. 4B.

FIG. 4B is a flow chart illustrating a method according to example embodiments.

At S450, the source cell 405 generates a CHO request and transmits the CHO request to the cell 420. The source cell 405 generates the CHO request based on the connection between the UE and the source cell. The source cell 405 may send CHO requests to all of its neighbors, i.e., also cell 435. In some example embodiments, if the source cell 405 has earlier received measurement reports from the UE 402 (not shown in the FIG. 4B), the source cell 405 may choose to send a CHO request only to targets whose strength reported by the UE 402 is above a threshold. The target cell 420, based on the CHO request sent at S450, performs admission control, reserves resources and takes other steps used in a HO for the UE 402. In at least one example embodiment, the target cell 420 further prepares the cell 417 for the CHO of the UE 402 based on the CHO request sent at S450 (not shown in FIG. 4). In another embodiment, the source cell 405 sends a separate CHO request to cell 417 (not shown in FIG. 4).

At S455, the cell 420 responds to the request by generating and transmitting a CHO acknowledgement to the source cell 405. In the CHO acknowledgement, the cell 420 includes a permitted performance margin. If the cell 420 is aware of the cell 435, the cell 420 may include a permitted performance margin for the cell 435 in the CHO acknowledgement. Moreover, the cell 420 may include information regarding permitted performance margins of cells in the same target. For example, the cell 420 may include information regarding a permitted performance margin of the cell 417. In another example embodiment, if the source cell 405 has sent separate CHO requests to target cells 420 and 417, and the cell 417 is aware of the performance margin of its neighbor cell 435, the cell 417 can include the permitted performance margin associated with the cell 435 in the CHO acknowledgment.

The permitted performance margin may be a threshold interference level or a maximum UL transmit power associated with the neighbor cell, but is not limited thereto. The threshold interference level and maximum UL transmit power are values determined by the neighbor cell and are values the neighbor cell can tolerate from a UE that is served by a particular cell other than the neighbor cell.

In some example embodiments, the permitted performance margin is for a particular frequency and may be a UE measured strength (e.g., RSRP) of a target cell (e.g., cell 417) relative to a neighboring cell strength (e.g., RSRP) in a neighboring target on the same frequency (e.g., cell 435). In such example embodiments, the permitted performance margin is a signal offset expressed in dB.

As an alternative to providing the permitted performance margin in the CHO acknowledgement at S455, the source cell 405 may generate a query separate from the CHO request for the permitted performance margin and send the query to the cell 420. The cell 420 may respond to the query by sending the permitted performance margin of the cell 435 to the source cell 405. In some example embodiments, the signaling of the query and permitted performance is relayed via the Xn interface using, for example, the Xn Application Protocol (XnAP) protocol. The source cell 405 may also query the cell 417 in a similar fashion. The queried cell may respond the query if it has obtained a NeighbourInformation IE comprising the permitted performance margin of its neighbor cell 435.

Each cell may determine a permitted performance margin based on based on adaptive and learning algorithms, which consider the interference in the cell, the load in the cell, and the UE or system performance. For example, a cell may alter its associated permitted performance margin based on a number of UEs the cell is serving. The cell may indicate a relatively larger permitted performance margin when serving a relatively smaller number of UEs (and/or with relatively smaller load) compared to indicating a relatively lower permitted performance margin when serving a relatively larger number of UEs (and/or with relatively larger load). The load of a cell may be the percentage of used resource blocks or an average SINR of communications between the cell and the UEs being served by the cell. In a case of unlicensed spectrum, the load it may be a channel occupancy as seen by network node or seen by UEs connected to the network node.

The CHO acknowledgment may contain the HO command for the UE. Thus, the CHO acknowledgement may contain the multi-cell target configuration.

The target cell 420 can be aware of its neighbors, the possibility to establish DC connections, and neighbors of DC connections based on network higher layer configuration, such as operations, administration and management (OAM). Moreover, the target cell 420 can be aware of neighbors' neighbors using Xn signaling without OAM, as described above.

In other example embodiments, the cell may use a default permitted performance margin. The default margin may be that used also for the HO to a target cell, that is the offset that is applied to the difference between serving and target cell when evaluating which cell is stronger. In some example embodiments, the default permitted performance margin may be 3 dB.

If the source cell 405 does not receive a permitted performance margin for a target's neighboring cells, the cell 405 sends queries to neighboring cells of the target for which a permitted performance margin has not been received. For example, if the source cell 405 does not receive a permitted performance margin for the cell 435 at S455, the cell 405 will query the cell 435 for the permitted performance margin of the cell 435 at S460.

At S465, the cell 435 responds to the query by transmitted a permitted performance margin to the source cell 405. The signaling of the query and the permitted performance margin may be carried out by the source cell 405 and the cell 435 using the XnAP.

At S470, the source cell 405 sends a CHO command to the UE 402. The command indicates the configuration of the first target configuration 410 and contains the permitted performance margin for the cell 435 on the frequency f1.

At S475, the UE 402 evaluates the CHO condition for the first target configuration 410.

Figure 5:
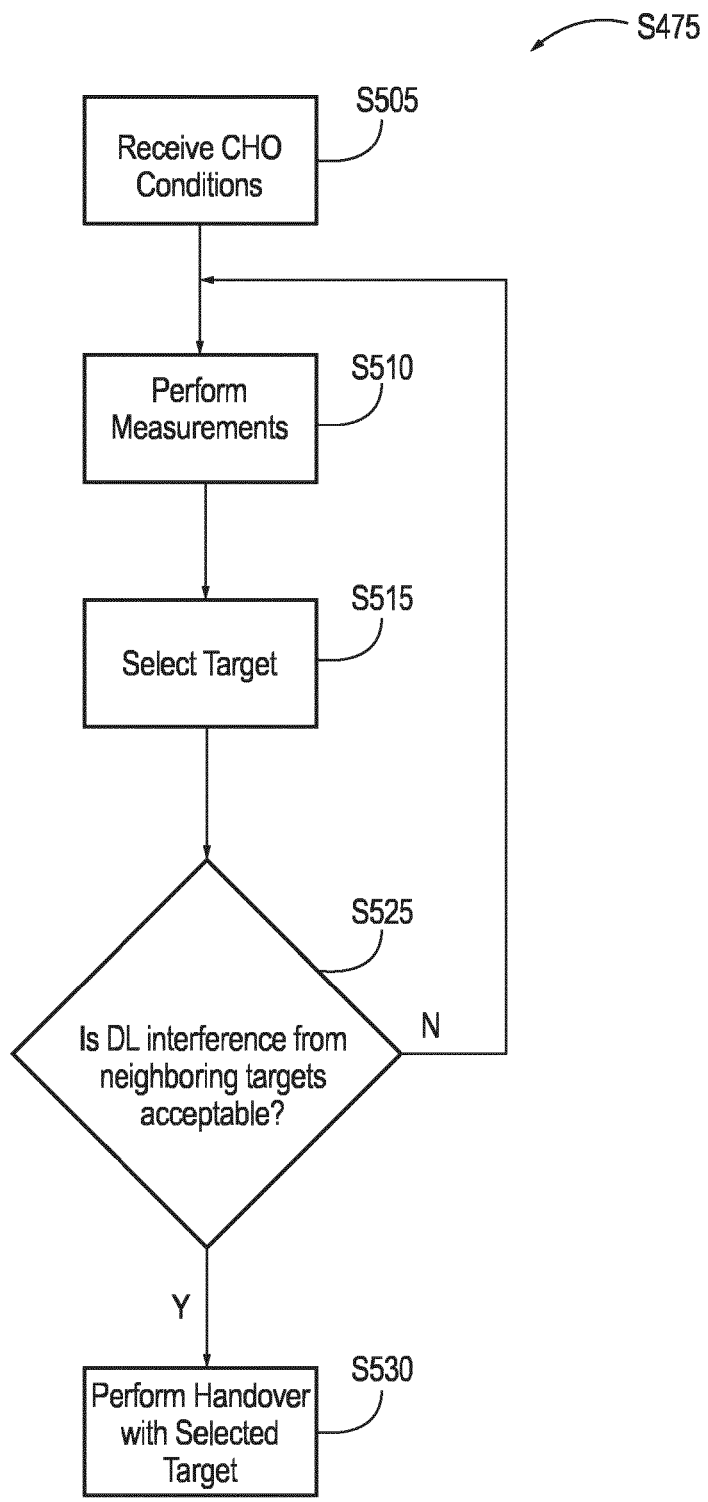
FIG. 5 is a flow chart illustrating a method of evaluating a conditional handover (CHO) condition according to example embodiments.

FIG. 5 is a flow chart illustrating a method of evaluating a CHO condition according to example embodiments.

At S505, the UE 402 obtains at least one CHO condition from the source cell 405. The at least one CHO condition includes the performance margin associated with the cells (e.g., the cell 435) neighboring the target cell.

At S510, the UE 402 performs measurements regarding the cells indicated in the CHO command. More specifically, the UE 402 may perform RSRP and RSRQ measurements for each of the cells indicated in the CHO command. In some example embodiments, the CHO command identifies target cells, and conditions to be fulfilled. The conditions refer to one or more of the target cells. The UE performs evaluation of the conditions in the CHO command. In the example of FIGS. 4A-4B, the UE 402 measures the RSRP and/or RSRQ for the cell 417, the cell 420 and the cell 435.

At S515, the UE 402 tentatively selects a target configuration for HO based on a condition being satisfied. For example, assuming part of the conditions is an A3 event for the serving and one of the target configuration cells, the UE 402 tentatively selects the first target configuration 410 when an A3 event occurs for the cell 420.

The UE 402 determines whether DL transmissions from the cells in the targets neighboring the selected target are within the permitted performance margin of the UE 402 at S525.

In some example embodiments, the UE 402 measures a RSRP from the target cell 430 and a RSRP from the cell 435. The UE 402 determines a difference between the RSRP from the target cell 430 and the RSRP from the cell 435. The UE 402 then compares the difference to the permitted performance margin associated with the target cell 430 and the cell 435. If the difference is less than the permitted performance margin, the DL transmissions from the cell 435 are within the permitted performance margin.

If the UE 402 determines the DL transmissions from any one of the cells in the targets neighboring the selected target are not within the permitted performance margin, the method proceeds back to S510 where the UE 402 performs measurements again.

Pseudo code for S525 may be:

for all freq f_i that are contained in the selected target configuration
    create list L(f_i) of cells neighboring to target cell c target(f_i) on freq f_i for all cells c neighbor(f_i) in L(f_i)
        evaluate c neighbor(f_i) permissible performance margin to c target(f_i)

If the UE 402 determines the DL transmissions from the cells in the targets neighboring the selected target are within the permitted performance margin, the UE 402 performs the HO with the selected target (i.e., target configuration 410) at S530.

In the above example of FIGS. 4A-4B, the cell 417 had one neighbor, the cell 435, using the same frequency and the cell 420 has no neighbor using the same frequency. However, it should be understood all cells may have neighbors on their frequencies. In small cell deployments on a given frequency, some cells may have neighbors and some may not have.

The CIO is a cell-specific offset that is added to the imbalance evaluation of a target cell. Taking HO event A3 as an example: In 3GPP TS 38.311 section 5.5.4.4 "event A3: neighbor becomes offset better than SpCell", where a leaving condition occurs when $$Mn+Ofn+Ocn+Hys<Mp+Ofp+Ocp+Off$$

where Mn is a measurement result of the neighboring cell, not taking into account any offsets, Ofn is a measurement object specific offset of the reference signal of the neighbor cell (i.e. offsetMO as defined within measObjectNR corresponding to the neighbor cell), Ocn is a cell specific offset of the neighbor cell (i.e. cellIndividualOffset as defined within measObjectNR corresponding to the frequency of the neighbor cell), and set to zero if not configured for the neighbor cell, Mp is a measurement result of the SpCell, not taking into account any offsets, Ofp is a measurement object specific offset of the SpCell (i.e. offsetMO as defined within measObjectNR corresponding to the SpCell), Ocp is a cell specific offset of the SpCell (i.e. cellIndividualOffset as defined within measObjectNR corresponding to the SpCell), and is set to zero if not configured for the SpCell, Hys is the hysteresis parameter for the event (i.e. hysteresis as defined within reportConfigNR for the event), Off is an offset parameter for the event (i.e. a3-Offset as defined within reportConfigNR for the event), Mn, Mp are expressed in dBm in case of RSRP, or in dB in case of RSRQ and RS-SINR, and Ofn, Ocn, Ofp, Ocp, Hys, Off are expressed in dB.

Example embodiments differ from CIO Ocn and Ocp in that the performance margin is not evaluated between the source cell and the target cell of handover but rather between a cell in a target HO configuration and any other neighbor cell using same frequency.

Aggregate Measurement

In networks with small cells, multi-connectivity may be a default way of operating or configuring a UE. Thus, choosing one target Primary Cell (PCell) for handover out of several ones based on its cell quality and its corresponding potential Secondary Cell, i.e., that can be configured for Dual Connectivity or Carrier Aggregation (CA) operation, i.e. PSCell or Scell, respectively, improves the network. Considering the signal strength/quality of potential PSCells or SCells in the handover could be beneficial for DC or CA operation where the aggregate performance of the radio links could be more relevant than the signal strength/quality of the individual links.

According to at least some example embodiments, systems use an aggregate measurement of cells which belong to a target configuration as a condition to carry out a CHO. A condition that takes into account a parameter (e.g., RSRP) from at least two cells in a same target configuration including multiple cells (e.g., DC and/or CA) may be referred to as an aggregate condition.

The aggregate measurement will be computed by the UE using measurements of the identified target cells. The way the aggregate measurement is formed and is applied as the aggregate condition may be signaled.

Figure 6:
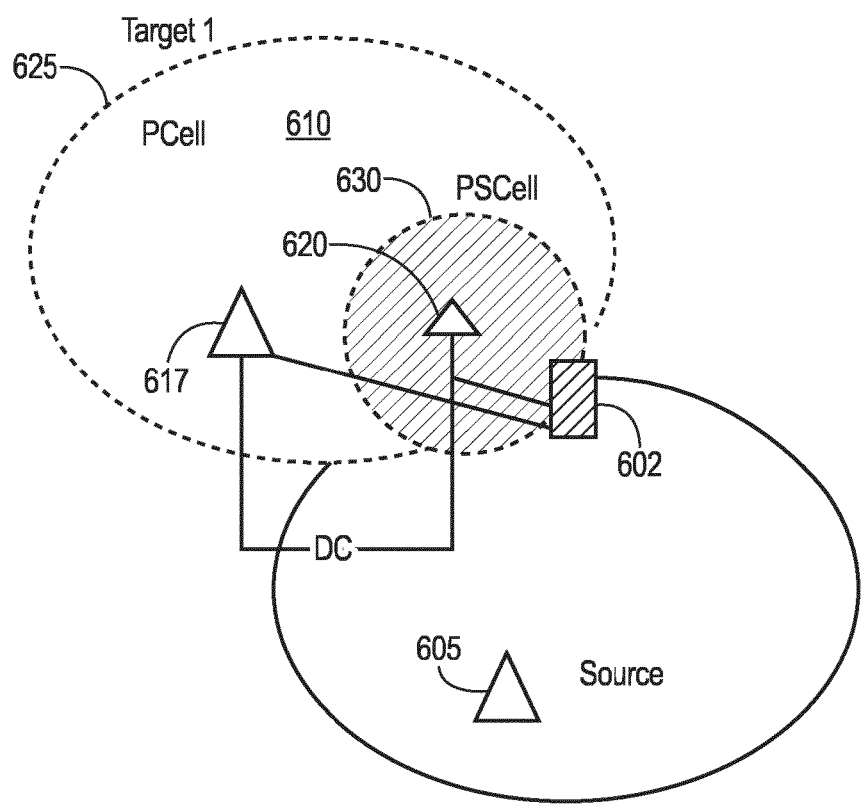
FIG. 6 illustrates a system having at least one target for a handover.

FIG. 6 illustrates a system having at least one target for a handover.

As shown in FIG. 6, a UE 602 communicates with a source cell 605. Based on the location of the UE 602, the UE 602 has a first target configuration 610 for handover.

The first target configuration 610 includes a cell 617 and a cell 620 that are configured to provide dual connectivity. The cell 617 can operate as a PCell and provides a primary cell of coverage 630. The cell 620 can operate as a PSCell and provides a primary secondary cell of coverage 625.

Figure 7:
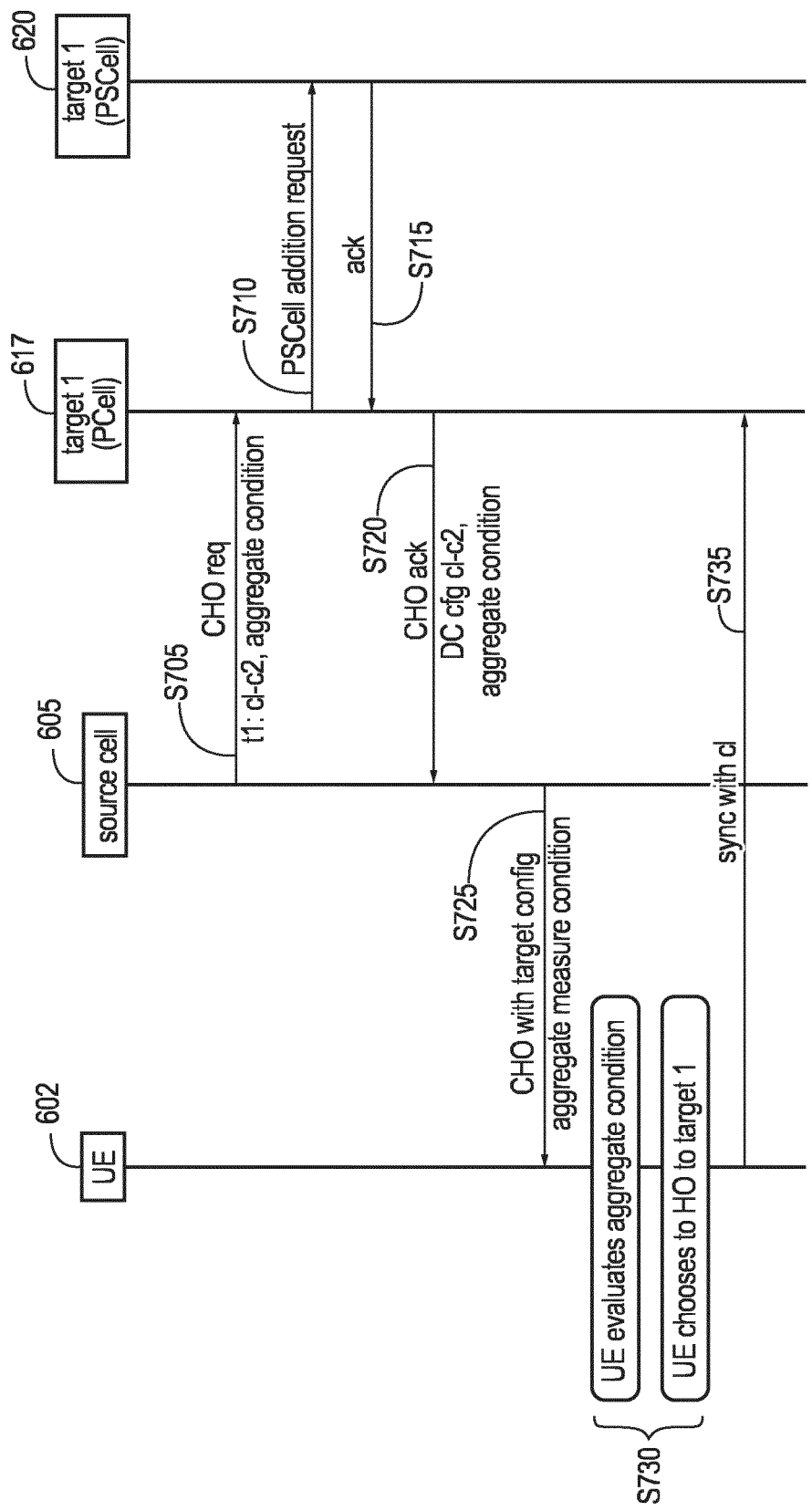
FIG. 7 is a flow chart illustrating a method according to example embodiments.

FIG. 7 is a flow chart illustrating a handover method using an aggregate measure according to example embodiments.

In some example embodiments, a condition to carry out a CHO comprises an aggregate measurement of several cells which belong to a target configuration. This allows selecting a target configuration which will have overall better performance.

At S705, the source cell 605 prepares the cell 617 for a CHO by generating and sending a CHO request to the cell 617. The CHO request includes a particular configuration (e.g., DC configuration) determined by the source cell 605 and an aggregate condition. The source cell 605 may determine the configuration based on measurement reports from the UE 602. The aggregate condition may comprise at least one parameter that is to be used by the when UE determining whether a CHO is to be carried out, such as a threshold. The aggregate condition may include a selection of an algorithm by a network node that determines how the UE evaluates the multiple cells of the target. The set of possible algorithms may be made known to the UE by way of standardization. The condition—selection of algorithm and at least one parameter—is determined by OAM or by the source gNB based on UE capabilities, Quality of Service (QoS) requirements, cell maximal capacities, system load, a subcombination thereof or a combination thereof, for example. The signaling may include parameters to be used by the algorithm, such as which cells are to be summed, and what margins are to be applied. The parameters may include RSRP, RSRQ, SINR, a subcombination thereof or a combination thereof as measurements from target cells for a CHO. In addition to or alternatively, the parameters may include a listen-before-talk (LBT) failure rate, a received signal strength indicator (RSSI), a channel occupancy (CO), a subcombination thereof or a combination thereof.

Example embodiments of algorithms and parameters for the aggregate condition are described in more detail with reference to FIGS. 8-10.

In other example embodiments, the aggregate condition may be set to a default value by the source cell 605.

More detailed examples are described below.

At S710, the cell 617 transmits a request to the cell 620 to add the cell as a PSCell for the CHO. At S715, the cell 620 acknowledges that it will be part of the multiple cell target configuration for a CHO.

At S720, the cell 617 sends a CHO acknowledgement to the source cell 605. The CHO acknowledgement indicates a DC configuration of the first target configuration 610 identifying the PCell and PSCell.

At S725, the source cell 605 sends a CHO command to the UE 602 indicating the DC configuration of the target configuration (i.e., configuration of the first target configuration 610).

At S730, the UE 602 obtains measurements from the cell 617 and the cell 620 to determine whether the aggregate condition is satisfied and determines to perform a HO to the first target configuration 610 when the aggregate condition is satisfied. Example embodiments of measuring an aggregate condition are described in more detail below with reference to FIGS. 8-9.

When the UE 602 determines that the aggregate condition is satisfied, the UE 602 performs access to the cell 617 by, for example, using a random access procedure (RACH) or performs a RACH-less access. The performing access is sometimes described as a synchronization with the target.

Figure 8:
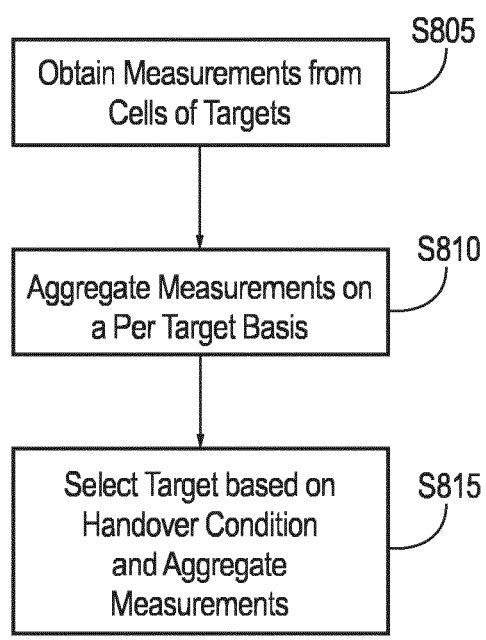
FIG. 8 is a flow chart illustrating a method according to example embodiments.

FIG. 8 is a flow chart illustrating a method according to example embodiments. More specifically, FIG. 8 illustrates a method of selecting a target by a UE based on the aggregate condition and aggregate measurements.

At S805, the UE obtains measurements from cells of targets for the parameters of the aggregate condition. For example, the UE obtains an RSRP from cells of targets. The UE may determine an RSRQ, a signal to interference and noise ratio (SINR) or both the RSRQ and then SINR. In some example embodiments, the UE may measure the RSRP, the RSRQ, the SINR, a subcombination thereof or a combination thereof as measurements from target cells in accordance with the aggregate condition of the CHO. In addition to or alternatively, the UE determine an LBT failure rate, a RSSI, a CO, a subcombination thereof or a combination thereof as measurements of target cells in accordance with the aggregate condition of the CHO.

At S810, the UE aggregates the measurements on a per target basis. More specifically, the UE combines the measurements for all cells in a same target configuration. For example, the UE combines (i.e., sums) the RSRP from each cell in a single DC target configuration.

In at least one other example embodiment, the source cell instructs the UE to consider only up to n strongest cells in the target cell (i.e., as part of the aggregate condition) and the UE determines the aggregate measurement as summing only up to the n strongest cells in the target, n<amount of cells in target. If n is one, the aggregate measurement amounts to selecting the strength of the strongest cell. In other example embodiments, the source cell instructs the UE to sum RSRPs from each cell or n strongest RSRPs (i.e., as part of the aggregate condition) and the UE determines the measurement by combining the RSRP from each cell in a first target or combining the n strongest RSRP from each cell in the first target and comparing it to a sum of RSRPs of a second target (of each cell in the second target or n strongest in the second target based on the aggregate condition), or comparing it to the sum of a configuration including the source cell (of each cell in the configuration including the source cell or n strongest in the configuration including the source cell). For example, if the aggregate condition is to sum the n strongest RSRPs of the first target configuration and compare the sum to the n strongest RSRPs of the second target configuration and HO based on which combination is greatest and above a threshold, the UE sums the n strongest RSRPs of the first target configuration and compares the sum to a sum of the n strongest RSRPs in the second target configuration. The UE then compares the larger sum to a threshold and if the larger sum is greater than a threshold (e.g., RSRP of the source cell plus an offset value), the UE performs the HO with a target cell in the target configuration associated with the larger sum.

At S815, the UE selects a target configuration based on the aggregate HO condition and the aggregated measurements for each target configuration.

Figure 9:
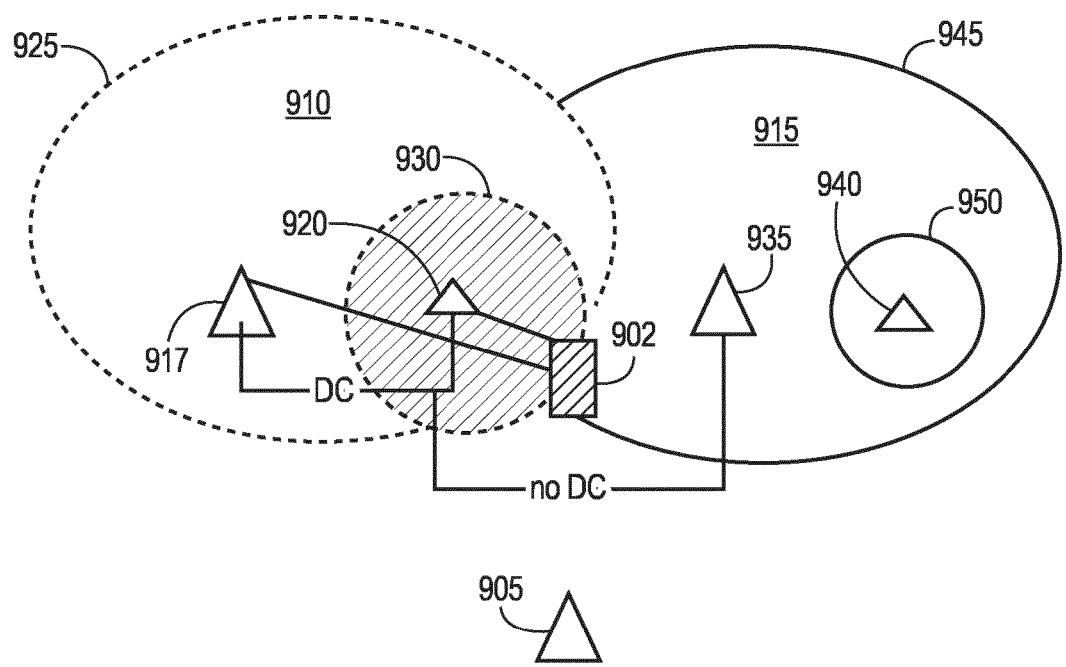
FIG. 9 illustrates a system having two potential targets for a handover.

FIG. 9 is used to illustrate example embodiments of aggregating measurements on a per target basis. FIG. 9 illustrates a system having two target configurations for a handover.

As shown in FIG. 9, a UE 902 communicates with a source cell 905. Based on the location of the UE 902, the UE 902 has a first target configuration 910 for handover and a second target configuration 915 for handover.

The first target configuration 910 includes a cell 917 and a cell 920 that are configured to provide dual connectivity. The cell 917 can operate as a primary node and provides a primary cell of coverage 925. The cell 920 can operate as a secondary node and provides a primary secondary coverage area 930. While the secondary cell of coverage 930 is illustrated as being completely within the primary coverage area 925, example embodiments are not limited therein.

The second target configuration 915 includes a cell 935 and a cell 940 that are configured to provide dual connectivity. The cell 935 can operate as a primary node and provides a primary coverage area 945. The cell 940 can operate as a secondary node and provides a primary secondary coverage area 950.

The first target configuration 910 and the second target configuration 915 are configured to provide dual connectivity to a UE.

In some example embodiments, the source cell 905 defines the HO condition as an event A3. Assuming the first target configuration 910 is in a single target HO scenario, the HO trigger condition is reached if $$\text{strength(source cell 905)} < \text{strength(cell 917)} - O$$

where O is an offset. For a multi-cell target, the aggregate measurement may be introduced by scaling the offset such that not a single target cell is considered, but the sum of all target cells. Thus, in the above equation of a traditional A3 event the offset O is replaced by a scaled offset:

$$O\_scaled = O + \text{strength (cell 917)} - \Sigma \text{ strength(cells of target configuration 910)}$$

This type of scaled offset yields an aggregate condition using an aggregate measurement of the multiple cells of the target:

$$\text{strength(source cell 905)} < \text{strength(cell 917)} - O\_scaled, \text{ which equates to}$$

$$\text{strength(source cell 905)} < \Sigma \text{ strength(cells of target configuration 910)} - O$$

In the above aggregate condition, the sum is computed by the UE over all cells of the first target configuration 910.

In other example embodiments, the cells in a target configuration can be sorted by the UE according to strength, and the UE may sum the n highest strengths where n is less than the number of cells in the target configuration. If n is one, the UE selects the cell having the highest strength.

The strength of a cell can be the RSRP, RSRQ, SINR, the LBT failure rate, CO, RSSI, a subcombination thereof or a combination thereof, but is not limited thereto.

Example embodiments also provide the use of aggregate measurements with more than one target configuration for a CHO. In the description below:

$$M = \Sigma \text{ strength(cells of target configuration)}$$

Using FIG. 9 as an example embodiment, the UE 902 obtains measurements from the first target configuration 910 and the second target configuration 915 as follows:
First target configuration 910:
PCell (cell 917), RSRP=−95 dBm;
PSCell (cell 920), RSRP=−80 dBm;
M1=−79.9 dBm
Second target configuration 915:
PCell (cell 935), RSRP=−91 dBm;
PSCell (cell 940), RSRP=−100 dBm;
M2=−90.5 dBm Assuming the strength of the source cell 905 is −95 dBm, and the offset O is 3 dB. The aggregate condition with aggregate measurements is triggered if strength(serving)<Σ strength(cells of target configuration)−O.

For the first target configuration 910 the aggregate condition evaluates as:

−95<−79.9−3

For the second target configuration 915 the aggregate condition evaluates as:

−95>−90.5−3.

Hence, in the above example embodiment, the aggregate condition would be fulfilled for the first target configuration 910, but not for the second target configuration 915. By contrast, in a legacy scenario the UE would have selected the cell 935 of the second target configuration 915 (first target configuration 910: −95>−95−3; target configuration 915: −95<−91−3).

Figure 10:
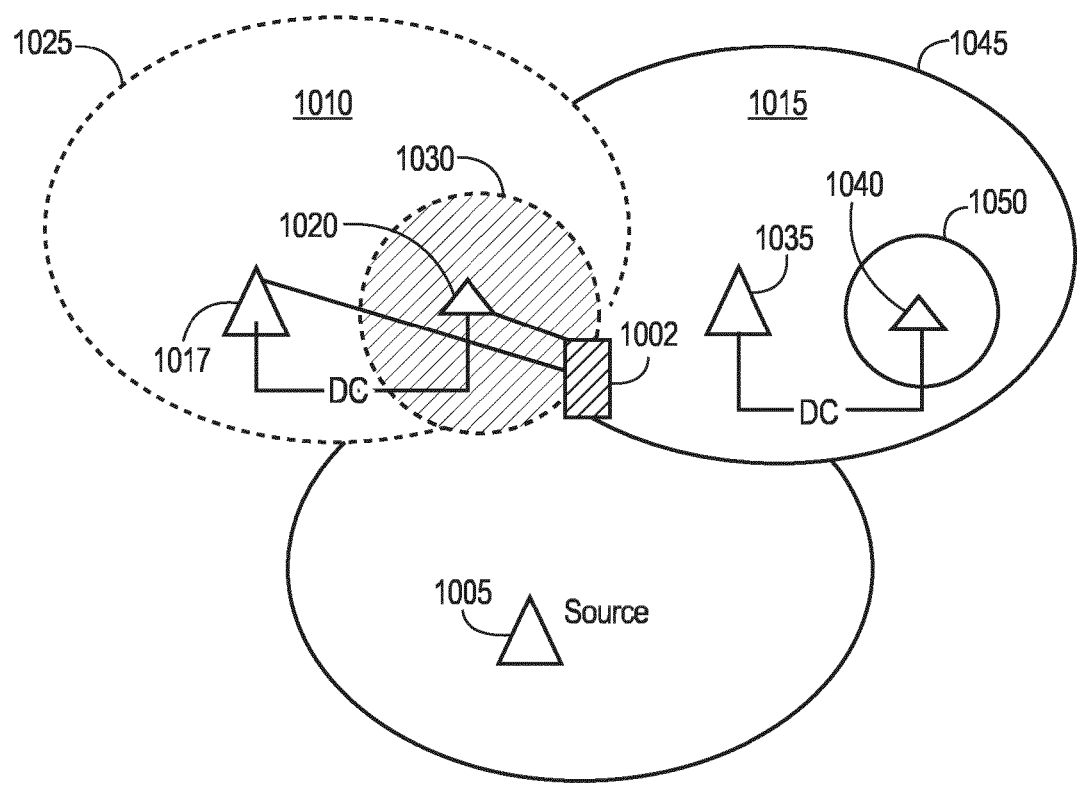
FIG. 10 illustrates a system having two potential targets for a handover.

FIG. 10 is used to illustrate other example embodiments of aggregating measurements on a per target basis. FIG. 10 illustrates a system having two target configurations for a handover.

As shown in FIG. 10, a UE 1002 communicates with a source cell 1005. Based on the location of the UE 1002, the UE 1002 has a first target configuration 1010 for handover and a second target configuration 1015 for handover.

The first target configuration 1010 includes a cell 1017 and a cell 1020 that are configured to provide dual connectivity. The cell 1017 can operate as a primary node and provides a primary cell of coverage 1025. The cell 1020 can operate as a secondary node and provides a primary secondary coverage area 1030. While the secondary cell of coverage 1030 is illustrated as being completely within the primary coverage area 1025, example embodiments are not limited therein.

The second target configuration 1015 includes a cell 1035 and a cell 1040 that are configured to provide dual connectivity. The cell 1035 can operate as a primary node and provides a primary coverage area 1045. The cell 1040 can operate as a secondary node and provides a primary secondary coverage area 1050.

The first target configuration 910 and the second target configuration 915 are not configured to provide dual connectivity to a UE. However, both the cell 1017 and the cell 1035 use the same frequency f1 and the cell 1020 and the cell 1040 use the same frequency f2.

The UE 1002 evaluates the handover condition between the source cell 1005 and the target cells of handover 1017 and 1050. In example embodiments, the UE scales the handover offset for the target cells of handover 1017 and 1050 based on the aggregate cell measurements. The following terminology is used:
Ms: measurement of serving cell 1005 by the UE 1002.
Mc1: Measurement of neighboring cell 1017 (a PCell) by the UE 1002.
Mc2: Measurement of neighboring cell 1020 (a PSCell) that can be configured to be in DC operation with the neighboring cell 1017 by the UE 1002.
Mc3: Measurement of neighboring cell 1035 (a PCell) that can be configured to be in DC operation with neighboring cell 1040 (a PSCell) by the UE 1002.

For an A3 event:

$Ms < Mc1 - O$ $Ms < Mc3 - O$

The UE 1002 is configured to determine the A3 event using aggregate cell measurement as follows:

$Ms < Mc1 - Oscaled1$ $Ms < Mc3 - Oscaled2$ where Oscaled1 is a scaled offset of the offset O for the target cell 1017 and Oscaled2 is a scaled offset of the offset O for the target cell 1035.

The UE 1002 determines the scaled offset Oscaled1 and the scaled offset Oscaled2 as follows using the abbreviation of Σ strength(cells of target configuration)=Σ cells of target:

$$Oscaled1 = O - 10\log10\left(\frac{\Sigma \text{ cells target 1}}{\Sigma \text{ cells target 2}}\right)$$

$$Oscaled2 = O - 10\log10\left(\frac{\Sigma \text{ cells target 2}}{\Sigma \text{ cells target 1}}\right)$$

The following provides an example embodiment of the determinations performed by the UE 1002 to select a target cell for handover using an offset O of 3 dB.

Example 1

If Σ cells target 1=sum(cell 1017, cell 1020)=Σ cells target 2=sum(cell 1035, cell 1040)

then $Oscaled1 = Oscaled2 = O = 3$ dB.

Consequently no scaling with aggregate cell strength takes place in Example 1.

Example 2

If Σ cells target 1=sum(cell 1017, cell 1020)=1.2*Σ cells target 2=1.2*sum(c3, c4)
then
Oscaled1=3−0.7918=2.2
and
Oscaled2=3+0.7918=3.7918 dB.

As a result, the UE 1002 determines the handover to the cell 1035 is harder than the handover to the cell 1017 in Example 2.

In some example embodiments, the UE 1002 limits the scaling of the offset O as follows:

$$Oscaled1 = O - \max\left(\min\left(10\log10\left(\frac{\Sigma \text{ cells target 1}}{\Sigma \text{ cells target 2}}\right), maxScaling\right), minScaling\right)$$

where maxScaling is a maximum scaled offset and minScaling is a minimum scaled offset.

The minScaling and maxScaling may be set by OAM and adjusted to avoid a too large imbalance in receive strength between neighbor cells above a threshold level when selecting a cell based on the aggregate measure.

In some example embodiments, the maximum scaled offset maxScaling is 1.5 dB and the minimum scaled offset minScaling is −1.5 dB. Using 1.5 dB and −1.5 dB as the maximum and minimum scaled offsets, respectively, and the values from Example 2, the UE 1002 determines the scaled offset Oscaled1 as:

Oscaled1=$O$−max(min(0.79,1.5),−1.5)=3−0.79.

The following provides an example where the UE 1002 uses the maximum and minimum scaled offsets as the max( ) value.

If $\frac{\Sigma \text{ cells target 1}}{\Sigma \text{ cells target 2}} =$ sum(cell 1017, cell 120)/sum(cell 1035, cell 1040) = 2 then
Oscaled1=O−max(min(3, 1.5), −1.5)=3−1.5=1.5
and
Oscaled2=O−max(min(3, −3), −1.5)=3+1.5=4.5

Combining Multiple Conditions

In some example embodiments, a source cell may instruct a UE to combine multiple Ai events and used the combined Ai events as the CHO condition. An Ai event includes any of the A1-A6 events described in 3GPP 36.331, Release 15.

In some example embodiments, the source cell may instruct the UE in the CHO command to select a target configuration if a trigger condition A4 of a PCell of the target configuration and trigger condition A4 of a PSCell of the target configuration are both met.

In other example embodiments, the source cell may instruct the UE in the CHO command to compare a same type of event from multiple target configurations. The source cell may instruct the UE to monitor an A3 event from a PCell of a first target configuration and monitor an A3 even from a PCell of a second target configuration. If A3 events occur for both the first target configuration and the second target configuration, the UE selects the first target configuration for HO if a sum of strength of all cells of the first target configuration is greater than a sum of strengths of all cells of the second target configuration at a particular instance. The sum of strengths of cells is evaluated in this example after a first condition of an A3 event is met to ensure that all cells in the target configuration can communicate with the UE.

In other example embodiments, the source cell may instruct the UE in the CHO command to evaluate an A3 event and another measure such as a missed-discovery reference signal (DRS)-count (for NR-unlicensed). If A3 events occur for both a first target configuration and a second target configuration, the UE is instructed to select a target configuration based on missed DRS counts for PCells of the first and second target configurations, respectively. If the missed DRS count for the PCell of the first target configuration is less than the missed DRS count for the PCell of the second target configuration, the UE selects the PCell of the first target configuration for handover.

Figure 11:
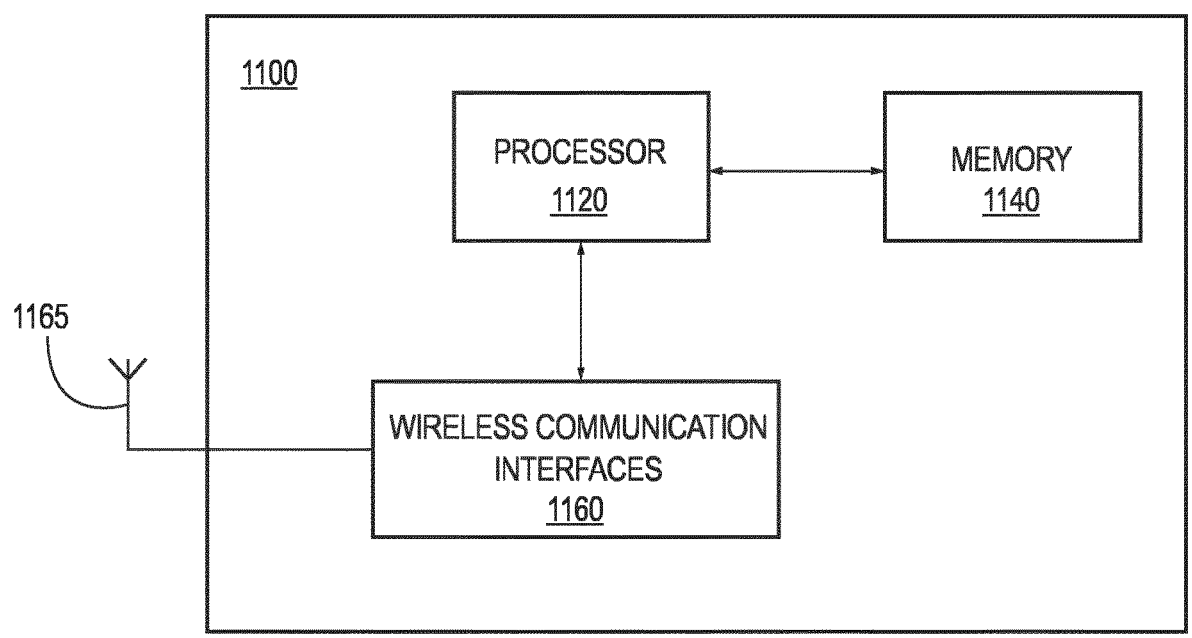
FIG. 11 is a block diagram illustrating an example embodiment of a network node.

FIG. 11 illustrates an example embodiment of a node, such as a gNB.

As shown, the gNB includes: a memory 1140; a processor 1120 connected to the memory 1140; various interfaces 1160 connected to the processor 1120; and one or more antennas or antenna panels 1165 connected to the various interfaces 1160. The various interfaces 1160 and the antenna 1165 may constitute a transceiver for transmitting/receiving data to/from a UE via a plurality of wireless beams or to/from one or more TRPs. As will be appreciated, depending on the implementation of the gNB, the gNB may include many more components than those shown in FIG. 11. However, it is not necessary that all of these generally conventional components be shown in order to disclose the illustrative example embodiment.

The memory 1140 may be a computer readable storage medium that generally includes a random access memory (RAM), read only memory (ROM), and/or a permanent mass storage device, such as a disk drive. The memory 1140 also stores an operating system and any other routines/modules/applications for providing the functionalities of the node (e.g., functionalities of a node, methods according to example embodiments, etc.) to be executed by the processor 1120. These software components may also be loaded from a separate computer readable storage medium into the memory 1140 using a drive mechanism (not shown). Such separate computer readable storage medium may include a disc, tape, DVD/CD-ROM drive, memory card, or other like computer readable storage medium (not shown). In some example embodiments, software components may be loaded into the memory 1140 via one of the various interfaces 1160, rather than via a computer readable storage medium.

The processor 1120 may be configured to carry out instructions of a computer program by performing the arithmetical, logical, and input/output operations of the system. Instructions may be provided to the processor 1120 by the memory 1140.

The various interfaces 1160 may include components that interface the processor 1120 with the antenna 1165, or other input/output components. As will be understood, the various interfaces 1160 and programs stored in the memory 1140 to set forth the special purpose functionalities of the node will vary depending on the implementation of the node.

The interfaces 1160 may also include one or more user input devices (e.g., a keyboard, a keypad, a mouse, or the like) and user output devices (e.g., a display, a speaker, or the like).

Although not specifically discussed herein, the configuration shown in FIG. 11 may be utilized to implement, inter alia, TRPs, gNBs, other radio access and backhaul network elements, Central Units (CUs), eNBs, ng-eNBs, or the like. In this regard, for example, the memory 1140 may store an operating system and any other routines/modules/applications for providing the functionalities of the TRPs, gNBs, etc. (e.g., functionalities of these elements, methods according to the example embodiments, etc.) to be executed by the processor 1120.

Figure 13:
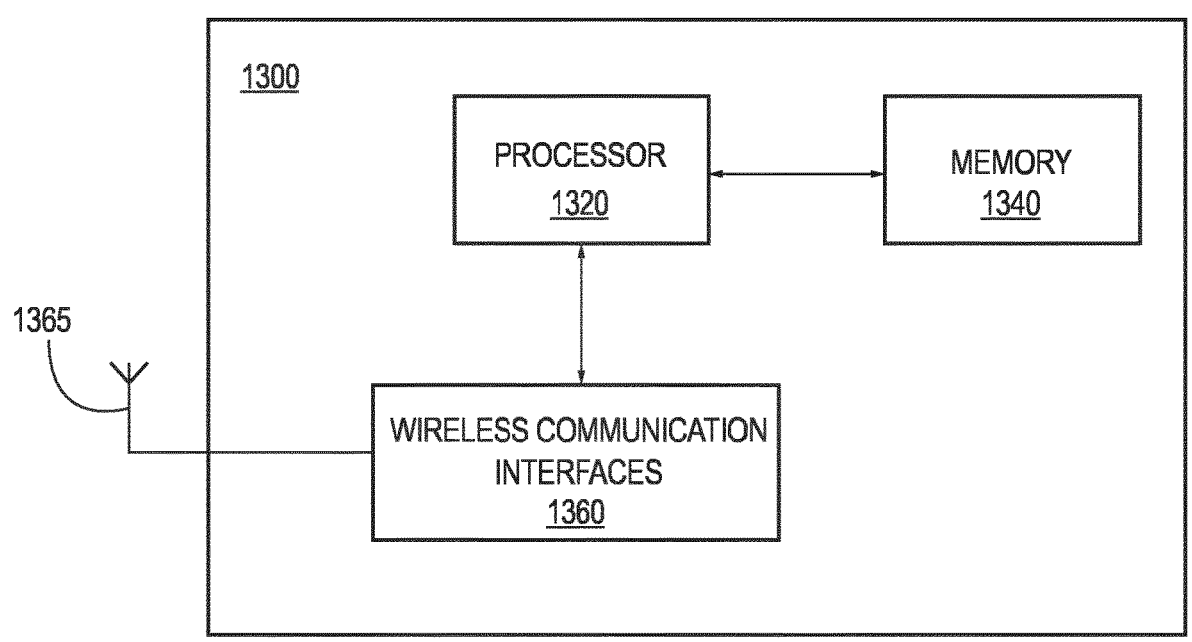
FIG. 13 is a block diagram illustrating an example embodiment of a user equipment (UE).

FIG. 13 illustrates an example embodiment of a user equipment (UE).

As shown, the UE includes: a memory 1340; a processor 1320 connected to the memory 1340; various interfaces 1360 connected to the processor 1320; and one or more antennas or antenna panels 1365 connected to the various interfaces 1360. The various interfaces 1360 and the antenna 1365 may constitute a transceiver for transmitting/receiving data to/from a network node via a plurality of wireless beams. As will be appreciated, depending on the implementation of the UE, the UE may include many more components than those shown in FIG. 13. However, it is not necessary that all of these generally conventional components be shown in order to disclose the illustrative example embodiment.

The memory 1340 may be a computer readable storage medium that generally includes a random access memory (RAM), read only memory (ROM), and/or a permanent mass storage device, such as a disk drive. The memory 1340 also stores an operating system and any other routines/modules/applications for providing the functionalities of the UE (e.g., functionalities of a UE, methods according to example embodiments, etc.) to be executed by the processor 1320. These software components may also be loaded from a separate computer readable storage medium into the memory 1340 using a drive mechanism (not shown). Such separate computer readable storage medium may include a disc, tape, DVD/CD-ROM drive, memory card, or other like computer readable storage medium (not shown). In some example embodiments, software components may be loaded into the memory 1340 via one of the various interfaces 1360, rather than via a computer readable storage medium.

The processor 1320 may be configured to carry out instructions of a computer program by performing the arithmetical, logical, and input/output operations of the system. Instructions may be provided to the processor 1320 by the memory 1340.

The various interfaces 1360 may include components that interface the processor 1320 with the antenna 1365, or other input/output components. As will be understood, the various interfaces 1360 and programs stored in the memory 1340 to set forth the special purpose functionalities of the node will vary depending on the implementation of the node.

The interfaces 1360 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, Central Units (CUs), ng-eNBs, WLAN access points (AP), WLAN stations (STA), other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A system comprising:
a source cell;
a user equipment;
at least one processor; and
at least one memory including computer program code, the at least one memory and the computer program code configured to, with the at least one processor, cause the user equipment to:
receiving measurement report from the user equipment, the measurement report comprising an aggregate measurement of cells that belong to a target configuration and provide dual connectivity;
based on the measurement report:
determining to use a conditional handover to hand off the user equipment; and
determine a particular configuration of a target;
preparing a first target cell from the particular configuration for the conditional handover by generating and sending a conditional handover request to the first target cell, the conditional handover request comprising the particular configuration and an aggregate condition of multiple cells in the target, the aggregate condition comprising an algorithm and parameters that determines how the user equipment evaluates multiple cells of the target, the selection of the algorithm and is based on capabilities of the user equipment, Quality of Service (QOS) requirements, cell maximal capacities, and system load, the parameters comprising: which cells are to be summed, at least one performance margin to be applied, reference signal received power, reference signal received quality, a signal to interference and noise ratio as measurements, a listen-before-talk failure rate, a received signal strength indicator, and a channel occupancy from the multiple cells;
receiving, from a first cell, a conditional handover acknowledgement confirming the particular configuration for the first cell and a second cell;
receiving measurements from the first cell and the second cell;
based on the measurements, determine the aggregate condition is satisfied; and
based on determining the aggregate condition is satisfied, performing access to the first cell using random access procedure.

2. The user equipment of claim 1, wherein the at least one performance margin is a permitted signal offset for a first frequency.

3. The user equipment of claim 2, wherein the permitted signal offset is a permitted difference between a measured signal strength of the first cell and a measured signal strength of the second cell.

4. The user equipment according to claim 1, wherein the at least one memory and the computer program code are further configured to, with the at least one processor, cause the user equipment to measure at least one signal from the first cell, determine whether a condition of the conditional handover is satisfied based on the measured at least one signal from the first cell, and select the first cell as a handover target cell if the condition is determined to be satisfied.

5. The user equipment of claim 4, wherein the at least one memory and the computer program code are further configured to, with the at least one processor, cause the user equipment to measure at least one signal from the source cell, and determine whether the condition of the conditional handover is satisfied based on the measured at least one signal from the source cell and the measured at least one signal from the first cell.

6. The user equipment of claim 5, wherein the at least one memory and the computer program code are further configured to, with the at least one processor, cause the user equipment to measure at least one signal from the second cell neighboring the first cell, determine whether to initiate the handover to the first cell based on the at least one performance margin, the measured at least one signal from the first cell and the measured at least one signal from the second cell neighboring the first cell.

7. A method comprising:
receiving measurement report, the measurement report comprising an aggregate measurement of cells that belong to a target configuration and provide dual connectivity;
based on the measurement report:
determining to use a conditional handover to hand off a user equipment; and
determine a particular configuration of a target;
preparing a first target cell from the particular configuration for the conditional handover by generating and sending a conditional handover request to the first target cell, the conditional handover request comprising the particular configuration and an aggregate condition of multiple cells in the target, the aggregate condition comprising an algorithm and parameters that determines how the user equipment evaluates multiple cells of the target, the selection of the algorithm and is based on capabilities of the user equipment, Quality of Service (QOS) requirements, cell maximal capacities, and system load, the parameters comprising: which cells are to be summed, at least one performance margin to be applied, reference signal received power, reference signal received quality, a signal to interference and noise ratio as measurements, a listen-before-talk failure rate, a received signal strength indicator, and a channel occupancy from the multiple cells;
receiving, from a first cell, a conditional handover acknowledgement confirming the particular configuration for the first cell and a second cell;
receiving measurements from the first cell and the second cell;
based on the measurements, determine the aggregate condition is satisfied; and
based on determining the aggregate condition is satisfied, performing access to the first cell using random access procedure.

8. The method of claim 7, wherein the at least one performance margin is a permitted signal offset for a first frequency.

9. The method of claim 8, wherein the permitted signal offset is a permitted difference between a measured signal strength of the first cell and a measured signal strength of the second cell neighboring the first cell.

10. The method according to claim 7, further comprising:
measuring at least one signal from the first cell;
determining whether a condition of the conditional handover is satisfied based on the measured at least one signal from the first cell; and
selecting the first cell as a handover target cell if the condition is determined to be satisfied.

11. The method of claim 10, further comprising:
measuring at least one signal from a source cell, wherein the determining whether the condition of the conditional handover is satisfied determines whether the condition of the conditional handover is satisfied based on the measured at least one signal from the source cell and the measured at least one signal from the first cell.

12. The method of claim 11, further comprising:
measuring at least one signal from the second cell neighboring the first cell, wherein the determining whether to initiate the handover includes, determining whether to initiate the handover to the first cell based on the at least one performance margin, the measured at least one signal from the first cell and the measured at least one signal from the second cell neighboring the first cell.

13. The method of claim 11, wherein the at least one performance margin comprises a threshold interference level.

14. The method of claim 13, wherein the at least one performance margin further comprises a maximum uplink transmit power associated with the second cell.

15. A non-transitory computer-readable medium comprising computer-executable instructions that, when executed by a processor, cause the processor to perform the following operations:
receiving measurement report, the measurement report comprising an aggregate measurement of cells that belong to a target configuration and provide dual connectivity;
based on the measurement report:
determining to use a conditional handover to hand off a user equipment; and
determine a particular configuration of a target;
preparing a first target cell from the particular configuration for the conditional handover by generating and sending a conditional handover request to the first target cell, the conditional handover request comprising the particular configuration and an aggregate condition of multiple cells in the target, the aggregate condition comprising an algorithm and parameters that determines how the user equipment evaluates multiple cells of the target, the selection of the algorithm and is based on capabilities of the user equipment, Quality of Service (QOS) requirements, cell maximal capacities, and system load, the parameters comprising: which cells are to be summed, at least one performance margin to be applied, reference signal received power, reference signal received quality, a signal to interference and noise ratio as measurements, a listen before-talk failure rate, a received signal strength indicator, and a channel occupancy from the multiple cells;
receiving, from a first cell, a conditional handover acknowledgement confirming the particular configuration for the first cell and a second cell;
receiving measurements from the first cell and the second cell;
based on the measurements, determine the aggregate condition is satisfied; and
based on determining the aggregate condition is satisfied, performing access to the first cell using random access procedure.

16. The non-transitory computer-readable medium of claim 15,
wherein the at least one performance margin is a permitted signal offset for a first frequency.

17. The non-transitory computer-readable medium of claim 16, wherein the permitted signal offset is a permitted difference between a measured signal strength of the first cell and a measured signal strength of the second cell neighboring the first cell.

18. The non-transitory computer-readable medium of claim 15, wherein the
computer-executable instructions further cause the processor to perform the following operations:
measuring at least one signal from the first cell;
determining whether a condition of the conditional handover is satisfied based on the measured at least one signal from the first cell; and
selecting the first cell as a handover target cell if the condition is determined to be satisfied.

19. The non-transitory computer-readable medium of claim 15, wherein the at least one performance margin comprises a threshold interference level.

20. The non-transitory computer-readable medium of claim 19, wherein the at least one performance margin further comprises a maximum uplink transmit power associated with the second cell.

* * * * *